United States Patent
Ando et al.

(10) Patent No.: US 10,703,902 B2
(45) Date of Patent: Jul. 7, 2020

(54) POLYCARBONATE RESIN COMPOSITION AND MOLDED BODY THEREOF

(71) Applicant: Mitsubishi Chemical Corporation, Chiyoda-ku (JP)

(72) Inventors: Masato Ando, Mie (JP); Tomohiko Tanaka, Mie (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 100 days.

(21) Appl. No.: 15/935,382

(22) Filed: Mar. 26, 2018

(65) Prior Publication Data

US 2018/0208764 A1    Jul. 26, 2018

Related U.S. Application Data

(63) Continuation of application No. PCT/JP2016/078735, filed on Sep. 28, 2016.

(30) Foreign Application Priority Data

Sep. 29, 2015 (JP) .................................. 2015-191606

(51) Int. Cl.
| | |
|---|---|
| *C08G 64/02* | (2006.01) |
| *C08G 64/30* | (2006.01) |
| *C08G 83/00* | (2006.01) |
| *C08L 5/16* | (2006.01) |
| *C08L 69/00* | (2006.01) |
| *C08L 71/02* | (2006.01) |

(52) U.S. Cl.
CPC .............. *C08L 69/00* (2013.01); *C08G 64/02* (2013.01); *C08G 64/305* (2013.01); *C08G 83/007* (2013.01); *C08L 5/16* (2013.01); *C08L 71/02* (2013.01); *C08L 2201/08* (2013.01)

(58) Field of Classification Search
CPC .. C08L 69/00; C08L 71/02; C08L 5/16; C08L 2201/08; C08G 83/007; C08G 64/02; C08G 64/305
See application file for complete search history.

(56) References Cited

U.S. PATENT DOCUMENTS

| | | | | |
|---|---|---|---|---|
| 6,100,329 A * | 8/2000 | Gibson | ................ | C08G 83/007 525/403 |
| 2007/0205395 A1* | 9/2007 | Nakajima | .......... | C09K 19/2007 252/299.01 |
| 2012/0301699 A1* | 11/2012 | Kinoshita | .......... | C08G 64/0208 428/220 |
| 2013/0131271 A1 | 5/2013 | Yokogi et al. | | |

FOREIGN PATENT DOCUMENTS

| | | |
|---|---|---|
| CN | 102695742 A | 9/2012 |
| CN | 103003361 A | 3/2013 |
| CN | 104024278 A | 9/2014 |
| JP | 2007-106860 | 4/2007 |
| JP | 2009-144015 | 7/2009 |
| JP | 2011-237511 | 11/2011 |
| JP | 2012-214637 | 11/2012 |
| JP | 2012-214666 | 11/2012 |
| JP | 2013-209460 | 10/2013 |
| WO | WO 2011/108515 A1 | 9/2011 |
| WO | WO 2012/165402 A1 | 12/2012 |
| WO | WO 2013/099842 A1 | 7/2013 |

OTHER PUBLICATIONS

International Search Report dated Oct. 25, 2016 in PCT/JP2016/078735 filed Sep. 28, 2016 (with English Translation).
Written Opinion dated Oct. 25, 2016 in PCT/JP2016/078735 filed Sep. 28, 2016.
Extended European Search Report dated Jun. 11, 2018 in European Patent Application No. 16851692.0.
Combined Chinese Office Action and Search Report dated Nov. 15, 2019 Chinese Patent Application No. 201680056222.2 (with English translation and English translation of Category of Cited Documents), 11 pages.

* cited by examiner

*Primary Examiner* — Patrick D Niland
(74) *Attorney, Agent, or Firm* — Oblon, McClelland, Maier & Neustadt, L.L.P.

(57) ABSTRACT

The present invention aims to provide a polycarbonate resin composition having impact resistance at high levels in good balance, a production method thereof, and a molded body of the polycarbonate resin composition. The present invention relates to a polycarbonate resin composition containing a polycarbonate resin (A) having a constitution unit derived from a compound represented by formula (1) and polyrotaxane (B), a production method thereof, and a molded body of the resin composition:

(1)

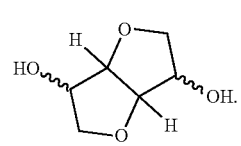

16 Claims, No Drawings

POLYCARBONATE RESIN COMPOSITION AND MOLDED BODY THEREOF

TECHNICAL FIELD

The present invention relates to a polycarbonate resin composition excellent in transparency and excellent in balance between mechanical characteristics such as impact resistance and tensile elongation and moist heat resistance, a production method thereof, and a molded body produced by molding the resin composition.

BACKGROUND ART

A conventional aromatic polycarbonate resin containing a structure derived from bisphenol A and the like and a new polycarbonate resin using isosorbide (ISB) which is a dihydroxy compound obtained from biomass resources whose research and development is progressing in recent years are excellent in heat resistance, transparency, and mechanical characteristics such as impact resistance, and are widely used for applications such as various mechanical components, optical discs and automobile components.

For example, when used for an application of automobile components, sustainable physical properties are demanded even in a wide temperature range and a rough environment assuming use at an extremely low temperature as in cold districts, at a high temperature when encountering direct sunlight in summer, and the like. As described above, the polycarbonate resin is extremely excellent in mechanical characteristics such as impact resistance at room temperature, and in contrast, mechanical characteristics such as tensile elongation due to heat aging at a high temperature are worse than those at room temperature. In addition, mechanical characteristics such as impact resistance at a low temperature are worse than those at room temperature. Examples of an improvement method thereof includes a method that allows a standard even if physical properties change in a wide temperature range and a rough environment by improving mechanical characteristics at room temperature.

In particular, the polycarbonate resin obtained from dihydroxy compound like isosorbide is not only excellent in optical characteristics, but also extremely excellent in weather resistance and surface hardness compared with the conventional aromatic polycarbonate resin, and in contrast, further improvement in mechanical characteristics such as impact resistance on a part where tensile elongation or stress concentrates is demanded. For such a subject, as a means for improving impact resistance, it is known that impact resistance is improved by containing a core and shell type elastomer in the polycarbonate resin (For example, refer to Patent Document 1.).

On the other hand, in recent years, polyrotaxane has attracted attention as one of materials for improving mechanical characteristics such as impact strength, and colored plastic for automobile members containing for example, polymethyl methacrylate (PMMA), polyrotaxane and colorant is developed (For example, refer to Patent Document 2.).

In addition, it is known that a functional group derived from an unsaturated carboxylic acid anhydride is given to the outer peripheral part of a cyclic molecule of polyrotaxane, and stress relieving energy is given to polyolefin by bonding polyrotaxane and a polyolefin modified with an unsaturated carboxylic acid anhydride, so that the impact resistance can be improved (For example, refer to Patent Document 3.).

However, an improvement example of mechanical characteristics using polyrotaxane in polycarbonate resin is not known heretofore.

BACKGROUND ART DOCUMENT

Patent Document

Patent Document 1: JP-A-2012-214666
Patent Document 2: JP-A-2007-106860
Patent Document 3: JP-A-2013-209460

SUMMARY OF THE INVENTION

Problems to be Solved by the Invention

According to study of the present inventors, as in the above Patent Document 1, a resin composition containing a core.shell type elastomer in a polycarbonate resin using isosorbide as monomer can obtain an excellent impact resistance. However, in the above resin composition, change of transparency and color tone of resin in a high temperature and humidity environment is prominent, and in case of long-term use in a high temperature and humidity environment, further improvement was demanded.

The present invention is made in view of such a background, compensates for defects of the polycarbonate resin, specifically maintains transparency and moist heat resistance, and provides a polycarbonate resin composition with improved mechanical characteristics such as tensile elongation and impact resistance, a production method thereof, and a molded body of the polycarbonate resin composition.

Means for Solving the Problems

The inventors of the present invention found out that the polycarbonate resin composition containing polycarbonate resin (A) and polyrotaxane (B) can improve mechanical characteristics such as tensile elongation and impact resistance at a high level as a result of intensive studies to solve the above problem. Namely, a summary of the present invention is the following [1] to [9].

[1] A polycarbonate resin composition comprising polycarbonate resin (A) having a constitution unit derived from a compound represented by at least the following formula (1) and polyrotaxane (B):

[Chemical Formula 1]

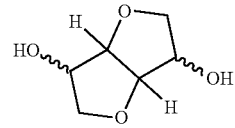

(1)

[2] The polycarbonate resin composition according to [1], wherein in the constitution unit of the polycarbonate resin (A), a proportion of the constitution unit derived from the compound represented by the formula (1) exceeds 30 mol % per 100 mol % of the constitution unit derived from all dihydroxy compounds.

[3] The polycarbonate resin composition according to [1] or [2], comprising 0.1 part by weight or more and less than 20 parts by weight of the polyrotaxane (B) per 100 parts by weight of a total amount of the polycarbonate resin (A) and the polyrotaxane (B).

[4] The polycarbonate resin composition according to any one of [1] to [3], wherein the polyrotaxane (B) contains polyethylene glycol and a cyclodextrin molecule.

[5] The polycarbonate resin composition according to any one of [1] to [4], comprising at least one compound (C) selected from a metal compound of long-period periodic table group 1 and a metal compound of long-period periodic table group 2.

[6] The polycarbonate resin composition according to [5], wherein a content of the compound (C) per 100 parts by weight of a total amount of the polycarbonate resin (A) and the polyrotaxane (B) in the polycarbonate resin composition is 0.5 ppm by weight or more and 1000 ppm by weight or less in a metal amount in the compound (C).

[7] The polycarbonate resin composition according to [5] or [6], wherein the compound (C) is at least one selected from the group consisting of an inorganic salt (including carbonate), a carboxylate, a phenolate, a halogen compound, and a hydroxide.

[8] The polycarbonate resin composition according to any one of [5] to [7], wherein, the compound (C) is at least one selected from the group consisting of a sodium compound, a potassium compound, a magnesium compound, a calcium compound, and a cesium compound.

[9] A molded body obtained by molding the polycarbonate resin composition according to any one of [1] to [8].

Effect of the Invention

The polycarbonate resin composition and the molded body thereof in the present invention are excellent in transparency, and also in biological origin material content rate, heat resistance, moist heat resistance, and impact resistance at high levels in good balance.

DESCRIPTION OF EMBODIMENTS

Description of embodiments is described in detail below, and description of constitution requirements described below is an example (representative example) of embodiments of the present invention. Unless a summary of the invention is exceeded, the present invention is not limited to the following content.

[Polycarbonate Resin (A)]

A polycarbonate resin (A) in the present invention is a resin bonding a constitution unit derived from a dihydroxy compound with carbonate. The constitution unit derived from the dihydroxy compound in the present invention is a constitution unit except a hydrogen atom from a hydroxyl group of the dihydroxy compound. The dihydroxy compound which becomes derivation of the constitution unit derived from the dihydroxy compound includes a dihydroxy compound of an aliphatic hydrocarbon, a nonaromatic dihydroxy compound having a hetero atom, and an aromatic dihydroxy compound, as described below. Among them, the polycarbonate resin (A) used in the present invention is characterized by having the dihydroxy compound represented by at least the following formula (1) as a constitution unit.

[Chemical Formula 2]

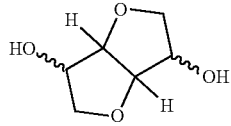

(1)

In addition, further, it is preferable to be a polycarbonate resin containing a constitution unit derived from a dihydroxy compound selected from the group consisting of dihydroxy compounds listed below. A combination way of the following dihydroxy compounds can be suitably selected according to characteristics requested for the polycarbonate resin, and the following dihydroxy compounds may be used alone or may be used as a copolymerized polycarbonate resin in which plural kinds are used in combination.

An aliphatic hydrocarbon of the dihydroxy compound of an aliphatic hydrocarbon can be a chain hydrocarbon or an alicyclic hydrocarbon. A nonaromatic dihydroxy compound having a hetero atom includes a dihydroxy compound containing ether group. In addition, a structural part having aromaticity of an aromatic dihydroxy compound includes an aromatic hydrocarbon represented by a benzene ring, a naphthalene ring and the like, and may be a structural part having a hetero atom such as a pyridine ring as long as it has aromaticity.

(Dihydroxy Compound of Aliphatic Hydrocarbon)

A dihydroxy compound of an aliphatic hydrocarbon is not particularly limited, and the aliphatic hydrocarbon may be a chain hydrocarbon or an alicyclic hydrocarbon. A dihydroxy compound having an alkylene group having a carbon number of preferably 1 to 20, further preferably 2 to 13, particularly preferably 3 to 12 is mentioned, and for example, the following dihydroxy compound can be used. A straight chain aliphatic dihydroxy compound such as ethylene glycol, 1,3-propanediol, 1,2-propanediol, 1,4-butanediol, 1,5-heptanediol, 1,6-hexanediol, 1,9-nonanediol, 1,10-decanediol, 1,12-dodecanediol and the like; and an aliphatic dihydroxy compound having a branched chain such as 1,3-butanediol, 1,2-butanediol, neopentyl glycol, hexylene glycol and the like are included.

Examples of the dihydroxy compound of the alicyclic hydrocarbon are not particularly limited. However, from the point that mechanical characteristics of the polycarbonate resin are good, examples thereof include a dihydroxy compound containing at least one structure of a 4 to 6-membered ring, among them, a compound containing a 5-membered ring structure or a 6-membered ring structure. In addition, the 6-membered ring structure may be fixed in a chair shape or a boat shape by a covalent bond. The alicyclic dihydroxy compound is a 5-membered ring structure or a 6-membered ring structure, so that heat resistance of the obtained polycarbonate can be improved. The number of carbon atom contained in the alicyclic dihydroxy compound is usually 70 or below, preferably 50 or below, further preferably 30 or below, and particularly preferably 13 or below. The larger this value is, the higher the heat resistance is, while synthesis becomes difficult; purification becomes difficult; or price rises. The smaller the number of carbon atom is, the easier purification is and the easier to obtain. For example, the following dihydroxy compound can be used. A dihydroxy compound which is a primary alcohol of an alicyclic hydrocarbon exemplified by a dihydroxy compound and the like derived from a terpene compound such as 1,2-cyclohexanedimethanol, 1,3-cyclohexanedimethanol, 1,4-cyclohexanedimethanol, tricyclodecanedimethanol pentacyclopentadecane dimethanol, 2,6-decalin dimethanol, 1,5-decalin dimethanol, 2,3-decalin dimethanol, 2,3-norbornane dimethanol, 2,5-norbornane dimethanol, 1,3-adamantanedimethanol, limonene, and the like; a dihydroxy compound which is a secondary alcohol or a tertiary alcohol of an alicyclic hydrocarbon exemplified by 1,2-cyclohexanediol, 1,4-cyclohexanediol, 1,3-adamantanediol, hydrogenated bisphenol A, 2,2,4,4-tetramethyl-1,3-cyclobutanediol, and the like.

(Nonaromatic Dihydroxy Compound Having Hetero Atom)

A nonaromatic dihydroxy compound having a hetero atom includes for example, a dihydroxy compound containing an ether group.

Examples of the dihydroxy compound containing an ether group are not particularly limited as long as the dihydroxy compound contains an ether structure in its molecule, and specifically include oxyalkylene glycols, a dihydroxy compound represented by the following formula (1), a dihydroxy compound containing an acetal ring, and the like. Among them, from the viewpoint of heat resistance, the polycarbonate resin (A) used in the present invention is characterized by having the dihydroxy compound represented by at least the following formula (1) as a constitution unit.

For example, diethylene glycol, triethylene glycol, tetraethylene glycol, polyethylene glycol, polypropylene glycol and the like can be used as oxyalkylene glycols.

[Chemical Formula 3]

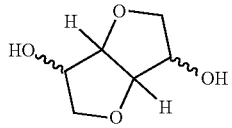

(1)

Examples of the dihydroxy compound represented by the above formula (1) include isosorbide (ISB), isomannide, and isoidet, which are in a stereoisomeric relationship. These may be used alone or in combination of two or more.

Among the dihydroxy compound represented by the above formula (1), isosorbide (ISB) which is obtained by dehydration condensation of sorbitol which is present abundantly as plant-derived resources and produced from easily obtainable various starches is most preferable from the aspect of ease of obtaining and producing, weather resistance, optical characteristics, moldability, heat resistance and carbon neutral.

In this connection, the dihydroxy compound represented by the above formula (1) is easily oxidized slowly by oxygen. Therefore, at the time of treatment during storage or production, to prevent decomposition by oxygen, moisture does not make to interfuse, and it is preferable to use a deoxidant, or be under a nitrogen atmosphere.

As the dihydroxy compound containing an acetal ring, for example, spiroglycol represented by the above formula (2) and dioxane glycol and the like represented by the following structural formula (3) can be used.

[Chemical Formula 4]

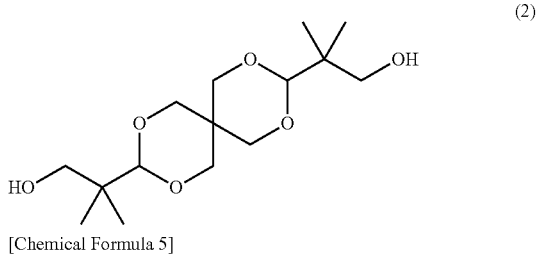

(2)

[Chemical Formula 5]

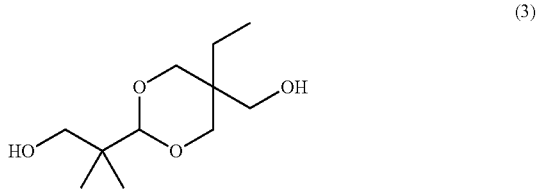

(3)

(Aromatic Dihydroxy Compound)

An aromatic dihydroxy compound may be any compound as long as it has a group having aromaticity in the molecule, and for example, the following dihydroxy compound can be used.

The aromatic dihydroxy compound represented by the following formula (4) is included.

[Chemical Formula 6]

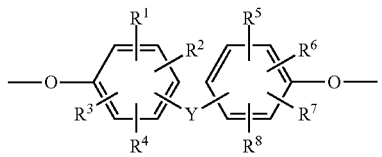

(4)

(Wherein, $R^1$ to $R^8$ in the above formula (4) show a hydrogen atom or a substituent group independently respectively. Y shows a single bond or a divalent group.)

Examples of substituents of $R^1$ to $R^8$ in the above formula (4) include an alkyl group having a carbon number of 1 to 10 which may have a substituent, an alkoxy group having a carbon number of 1 to 10 which may have a substituent, a halogen group, a halogenated alkyl group having a carbon number of 1 to 10, or an aromatic group having a carbon number of 6 to 20 which may have a substituent. Among them, the alkyl group having a carbon number of 1 to 10, or the aromatic group having a carbon number of 6~20 which may have a substituent is preferable. Examples of the divalent group of Y in the above formula (4) include an alkylene group of a chainlike structure having a carbon number of 1~6 which may have a substituent, an alkylidene group of a chainlike structure having a carbon number of 1~6 which may have a substituent, an alkylene group of a cyclic structure having a carbon number of 3~6 which may have a substituent, an alkylidene group of a cyclic structure having a carbon number of 3~6 which may have a substituent, —O—, —S—, —CO—, or —SO$_2$—. Here, unless the effect of the present invention is impaired, the substituent is not particularly limited, but usually the molecular weight is 200 or below. In addition, as the substituent of the alkylene group of a chainlike structure having a carbon number of 1 to 6, an aryl group is preferable, particularly a phenyl group is preferable.

The constitution unit derived from the dihydroxy compound in the present invention is a constitution unit excluding hydrogen atom from a hydroxyl group of the dihydroxy compound as described above. Specific examples of an aromatic dihydroxy compound corresponding to the constitution unit derived from the aromatic dihydroxy compound include the following.

A biphenyl compound such as 4,4'-biphenol, 2,4'-biphenol, 3,3'-dimethyl-4,4'-dihydroxy-1,1'-biphenyl, 3,3'-dimethyl-2,4'-dihydroxy-1,1'-biphenyl, 3,3'-di-(t-butyl)-4,4'-dihydroxy-1,1'-biphenyl, 3,3',5,5'-tetramethyl-4,4'-dihydroxy-1,1'-biphenyl, 3,3',5,5'-tetra-(t-butyl)-4,4'-dihydroxy-1,1'-biphenyl, and 2,2',3,3',5,5'-hexamethyl-4,4'-dihydroxy-1,1'-biphenyl.

A bisphenol compound such as bis-(4-hydroxy-3,5-dimethylphenyl) methane, bis-(4-hydroxyphenyl) methane, bis-(4-hydroxy-3-methylphenyl) methane, 1,1-bis-(4-hydroxyphenyl) ethane, 1,1-bis-(4-hydroxyphenyl) propane, 2,2-bis-(4-hydroxyphenyl) propane, 2,2-bis-(4-hydroxy-3-methylphenyl) propane, 2,2-bis-(4-hydroxyphenyl) butane, 2,2-bis-(4-hydroxyphenyl) pentane, 2,2-bis-(4-hydroxyphenyl)-3-methylbutane, 2,2-bis-(4-hydroxyphenyl) hexane, 2,2-bis-(4-hydroxyphenyl)-4-methylpentane, 1,1-bis-(4-hydroxyphenyl) cyclopentane, 1,1-bis-(4-hydroxyphenyl) cyclohexane, bis-(3-phenyl-4-hydroxyphenyl) methane, 1,1-bis-(3-phenyl-4-hydroxyphenyl) ethane, 1,1-bis-(3-phenyl-4-hydroxyphenyl) propane, 2,2-bis-(3-phenyl-4-hydroxyphenyl) propane, 1,1-bis-(4-hydroxy-3-methylphenyl) ethane, 2,2-bis-(4-hydroxy-3-ethylphenyl) propane, 2,2-bis-(4-hydroxy-3-isopropylphenyl) propane, 2,2-bis-(4-hydroxy-3-sec-butylphenyl) propane, 1,1-bis-(4-hydroxy-3,5-dimethylphenyl) ethane, 2,2-bis-(4-hydroxy-3,5-dimethylphenyl) propane, 1,1-bis-(4-hydroxy-3,6-dimethylphenyl) ethane, bis-(4-hydroxy-2,3,5-trimethylphenyl) methane, 1,1-bis-(4-hydroxy-2,3,5-trimethylphenyl) ethane, 2,2-bis-(4-hydroxy-2,3,5-trimethylphenyl) propane, bis-(4-hydroxyphenyl) phenyl methane, 1,1-bis-(4-hydroxy-2,3,5-trimethylphenyl) phenylethane, 1,1-bis-(4-hydroxy-2,3,5-trimethylphenyl) cyclohexane, bis-(4-hydroxyphenyl) phenyl methane, 1,1-bis-(4-hydroxyphenyl)-1-phenylethane, 1,1-bis-(4-hydroxyphenyl)-1-phenylpropane, bis-(4-hydroxyphenyl) diphenylmethane, bis-(4-hydroxyphenyl) dibenzylmethane, 4,4'-[1,4-phenylene bis(1-methylethylidene)] bis-[phenol], 4,4'-[1,4-phenylene bismethylene] bis-[phenol], 4,4'-[1,4-phenylene bis(1-methylethylidene)] bis-[2,6-dimethyl phenol], 4,4'-[1,4-phenylene bismethylene] bis-[2,3,6-trimethylphenol], 4,4'-[1,4-phenylene bis(1-methylethylidene)] bis-[2,3,6-trimethylphenol], 4,4'-[1,3-phenylene bis(1-methylethylidene)] bis-[2,3,6-trimethylphenol], 4,4'-dihydroxydiphenyl ether, 4,4'-dihydroxydiphenyl sulfone, 4,4'-dihydroxydiphenyl sulfide, 3,3',5,5'-tetramethyl-4,4'-dihydroxydiphenyl ether, 3,3',5,5'-tetramethyl-4,4'-dihydroxydiphenyl sulfone, 3,3',5,5'-tetramethyl-4,4'-dihydroxydiphenyl sulfide, phenolphthalein, 4,4'-[1,4-phenylene bis(1-methylvinylidene)] bisphenol, 4,4'-[1,4-phenylene bis(1-methylvinylidene)] bis[2-methylphenol], (2-hydroxyphenyl) (4-hydroxyphenyl) methane, (2-hydroxy-5-methylphenyl) (4-hydroxy-3-methylphenyl) methane, 1,1-(2-hydroxyphenyl) (4-hydroxyphenyl) ethane, 2,2-(2-hydroxyphenyl) (4-hydroxyphenyl) propane, and 1,1-(2-hydroxyphenyl) (4-hydroxyphenyl) propane.

A halogenated bisphenol compound such as 2,2-bis(3,5-dibromo-4-hydroxyphenyl) propane and 2,2-bis(3,5-dichloro-4-hydroxyphenyl) propane.

Among them, a preferable dihydroxy compound is bis-(4-hydroxy-3,5-dimethylphenyl) methane, bis-(4-hydroxyphenyl) methane, bis-(4-hydroxy-3-methylphenyl) methane, 1,1-bis-(4-hydroxyphenyl) ethane, 2,2-bis-(4-hydroxyphenyl) propane, 2,2-bis-(4-hydroxy-3-methylphenyl) propane, 2,2-bis-(4-hydroxy-3,5-dimethylphenyl) propane, 1,1-bis-(4-hydroxyphenyl) cyclohexane, bis-(4-hydroxyphenyl) phenylmethane, 1,1-bis-(4-hydroxyphenyl)-1-phenylethane, 1,1-bis-(4-hydroxyphenyl)-1-phenylpropane, bis-(4-hydroxyphenyl) diphenylmethane, 2-hydroxyphenyl (4-hydroxyphenyl) methane, and 2,2-(2-hydroxyphenyl) (4-hydroxyphenyl) propane.

Among them, bis-(4-hydroxyphenyl) methane, bis-(4-hydroxy-3-methylphenyl) methane, bis-(4-hydroxy-3,5-dimethylphenyl) methane, 2,2-bis-(4-hydroxyphenyl) propane, 2,2-bis-(4-hydroxy-3-methylphenyl) propane, 2,2-bis-(4-hydroxy-3,5-dimethylphenyl) propane, 1,1-bis-(4-hydroxyphenyl) cyclohexane are particularly preferable.

The polycarbonate resin (A) used in the present invention is characterized by having the dihydroxy compound represented by the above formula (1) as a constitution unit. In addition, as described above, it is preferable to be a polycarbonate resin containing a constitution unit derived from a dihydroxy compound selected from the group consisting of dihydroxy compounds listed above. A combination way of the above dihydroxy compounds can be suitably selected according to characteristics requested by the polycarbonate resin, and the above dihydroxy compounds may be used alone or may be used as a copolymerized polycarbonate resin in which plural types are used in combination. From the viewpoint of using plant-derived substances friendly to the earth environment and obtaining a polycarbonate resin having good heat resistance as described above, it is preferable that the polycarbonate resin (A) is characterized by containing a constitution unit (this is appropriately referred to as "constitution unit (a)".) derived from the dihydroxy compound represented by the formula (1), and further, to be a copolymerized polycarbonate resin containing a constitution unit (this is appropriately referred to as "constitution unit (b)".) derived from one or more dihydroxy compounds selected from the group consisting of a dihydroxy compound of the above aliphatic hydrocarbon, a nonaromatic dihydroxy compound having a hetero atom, and a dihydroxy compound containing an aromatic group, as other structural unit which is different from the constitution unit (a). Since the dihydroxy compounds of the constitution unit (b) have a soft molecule structure, the toughness, heat resistance and moldability of the obtained polycarbonate resin can be improved by using the dihydroxy compounds as raw materials. However, as the dihydroxy compounds of the constitution unit (b), from the viewpoint of mechanical characteristics, weather resistance and color tone of the polycarbonate resin, it is preferable to use at least one compound selected from the group consisting of a dihydroxy compound having no aromatic structure in the molecule structure, especially an aliphatic dihydroxy compound and an alicyclic dihydroxy compound.

Among the dihydroxy compounds of the constitution units (b), it is preferable to use a dihydroxy compound of an aliphatic hydrocarbon having great effect of improving weather resistance and toughness, and it is more preferable to use a dihydroxy compound of an alicyclic hydrocarbon.

In the polycarbonate resin (A), a constitution ratio of the copolymerized polycarbonate resin used in combination with the above plurality of dihydroxy compounds is not particularly limited. When using the dihydroxy compounds used in the formula (1), a content proportion of the constitution unit (a) per 100 mol % of a constitution unit derived from all dihydroxy compounds is preferably more than 30 mol %, more preferably 55 mol % or more and 95 mol % or less, further preferably 60 mol % or more and 90 mol % or less, and particularly preferably 65 mol % or more and 85 mol % or less. In these cases, a biological origin material content rate can be further raised, and heat resistance can be further improved. In this connection, although a content proportion of the constitution unit (a) in the polycarbonate resin (A) may be 100 mol %, from the viewpoint of further increasing molecular weight and from the viewpoint of further improving impact resistance, it is preferable that constitution units except the constitution unit (a) are copolymerized.

However, in a case where many constitution units derived from an aromatic dihydroxy compound in the polycarbonate resin (A) containing a constitution unit derived from the dihydroxy compound represented by the formula (1) are contained, the polycarbonate resin having a high molecular weight for the above reason cannot be obtained, and there is a risk that an effect of improving impact resistance decreases. Therefore, from the viewpoint that the impact resistance is further improved, a content proportion of the constitution unit derived from the dihydroxy compound containing an aromatic group is preferably 10 mol % or less, and more preferably 5 mol % or less per 100 mol % of the constitution unit derived from all dihydroxy compounds.

The dihydroxy compound represented by the formula (1) may contain stabilizers such as a reductant, an antioxidant, a deoxidant, a light stabilizer, an antacid, a pH stabilizer, or a heat stabilizer. Particularly, the dihydroxy compound represented by the formula (1) has a property of being easy to deteriorate in an acidic state. Therefore, the deterioration of the dihydroxy compound represented by the formula (1) can be inhibited by using a basic stabilizer in a synthesis process of the polycarbonate resin (A), and quality of the obtained polycarbonate resin composition can be further improved.

For example, the following compound can be used as a basic stabilizer.

Here, the first group of metal and the second group of metal in a long-period periodic table are simply written as "Group 1 metal" and "Group 2 metal" in the present specification. In addition, a compound of the first group of metal and a compound of the second group of metal are written as "compound of Group 1 metal" and "compound of Group 2 metal". Specific examples of the compound of Group 1 metal or the compound of Group 2 metal include a hydroxide, a carbonate, a phosphate, a phosphite, a hypophosphite, a borate and a fatty acid salt of Group 1 metal or Group 2 metal; a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; an amine compound such as diethylamine, dibutylamine, triethylamine, morpholine, N-methylmorpholine, pyrrolidine, piperidine, 3-amino-1-propanol, ethylenediamine, N-methyldiethanolamine, diethylethanolamine, diethanolamine, triethanolamine, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline, and a hindered amine compound such as di-(tert-butyl) amine and 2,2,6,6-tetramethylpiperidine.

Although a content of the basic stabilizer in the dihydroxy compound represented by the formula (1) is not particularly limited, since the dihydroxy compound represented by the formula (1) is unstable in an acidic state, it is preferable to set the content of the basic stabilizer so that pH of an aqueous solution of the dihydroxy compound containing the basic stabilizer is around 7.

It is preferable that the content of the basic stabilizer with respect to the dihydroxy compound represented by the formula (1) is 0.0001 to 1% by weight. In this case, an effect of preventing deterioration of the dihydroxy compound represented by the formula (1) is obtained sufficiently. From the viewpoint of further improving this effect, it is more preferable that the content of the basic stabilizer is 0.001 to 0.1% by weight.

[Production Method of Polycarbonate Resin (A)]

The polycarbonate resin of the present invention can be produced by a polymerization method used generally, and the polymerization method may be either a solution polymerization method using phosgene or a melting polymerization method of reacting with carbonic acid diester, but a melting polymerization method in which no solvent residue remains in the polycarbonate resin is preferable.

In detail, for example, a method described in JP-A-2008-24919 or JP-A-2011-246628 is mentioned.

The polycarbonate resin (A) is preferably obtained by polycondensating the dihydroxy compound and the carbonic acid ester by an ester exchange reaction in the presence of a polymerization catalyst.

As carbonic acid diester using raw materials of the polycarbonate resin (A), a compound represented by the following formula (7) can be adopted usually. These carbonic acid diesters may be used alone or in combination of two or more.

[Chemical Formula 7]

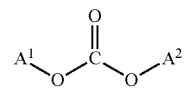

(7)

In the formula (7), $A^1$ and $A^2$ are substituted or unsubstituted aliphatic hydrocarbon groups having a carbon number of 1 to 18 or substituted or unsubstituted aromatic hydrocarbon groups respectively, and $A^1$ and $A^2$ may be same or different. As $A^1$ and $A^2$, it is preferable to use substituted or unsubstituted aromatic hydrocarbon groups, and more preferable to use unsubstituted aromatic hydrocarbon groups.

For example, substituted diphenyl carbonate such as diphenyl carbonate (DPC) and ditolyl carbonate, dimethyl carbonate, diethyl carbonate, di-tert-butyl carbonate, and the like can be adopted as the carbonic acid diester represented by the formula (7). Among the carbonic acid diesters, it is preferable to use diphenyl carbonate or substituted diphenyl carbonate, and it is particularly preferable to use diphenyl carbonate. In this connection, since there is a case where impurities such as chloride ions are contained and there is a case where the impurities impair a polycondensation reaction or color tone of the obtained polycarbonate resin is deteriorated, it is preferable to use refined carbonic acid diester by distillation and the like as necessary.

The polycarbonate resin (A) is synthesized by polycondensating the dihydroxy compound and the carbonic acid ester by an ester exchange reaction and in greater detail, is possibly obtained by removal out of the system of a monohydroxy compound and the like produced as a by-product in the ester exchange reaction along with the polycondensation.

The ester exchange reaction is conducted in the presence of an ester exchange reaction catalyst (the ester exchange reaction catalyst is called "polymerization catalyst" below.). Types of the polymerization catalyst can have a very big influence on reaction speed of the ester exchange reaction and quality of the obtained polycarbonate resin (A).

The polymerization catalyst is not limited as long as it can satisfy transparency, color tone, heat resistance, weather resistance, and mechanical strength of the obtained polycarbonate resin (A). As the polymerization catalyst, for example, compounds of metal of Group 1 and Group 2, and a basic compound such as a basic boron compound, a basic phosphorus compound, a basic ammonium compound and an amine compound can be used, among them, a compound of metal of Group 1 and/or a compound of metal of Group 2 is preferable, and a compound of metal of Group 2 is particularly preferable.

For example, the following compounds can be used as the compound of metal of Group 1. Sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, phenylated boron sodium, phenylated boron potassium, phenylated boron lithium, phenylated boron cesium, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholate of sodium, potassium, lithium and cesium, phenolate, disodium salt, dipotassium salt, dilithium salt, and dicesium salt of bisphenol A, and the like.

From the viewpoint of polymerization activity and color tone of the obtained polycarbonate resin, a lithium compound is preferable as the compound of metal of Group 1.

For example, the following compounds can be used as the compound of metal of Group 2. Calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the like.

As the compound of metal of Group 2, a magnesium compound, a calcium compound, or a barium compound is preferable, from the viewpoint of the polymerization activity and the color tone of the obtained polycarbonate resin, a magnesium compound and/or a calcium compound are further preferable.

In this connection, along with the compound of metal of Group 1 and/or the compound of metal of Group 2, basic compounds such as a basic boron compound, a basic phosphorus compound, a basic ammonium compound and an amine compound can be used subsidiarily in combination, but use of only the compound of metal of Group 1 and/or the compound of metal of Group 2 are particularly preferable.

For example, the following compounds can be used as the basic phosphorus compound. Triethylphosphine, tri-n-propylphosphine, triisopropylphosphine, tri-n-butylphosphine, triphenylphosphine, tributylphosphine, quaternary phosphonium salts, and the like.

For example, the following compounds can be used as the basic ammonium compound. Tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, butyltriphenylammonium hydroxide, and the like.

For example, the following compounds can be used as the amine compound. 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, aminoquinoline, guanidine, and the like.

A use amount of the polymerization catalyst is preferably from 0.1 to 300 µmol, more preferably from 0.5 to 100 µmol, and particularly preferably from 1 to 50 µmol per 1 mol of all dihydroxy compounds used in a reaction.

As a polymerization catalyst, in a case of using a compound containing at least one metal selected from the group consisting of metal of Group 2 and lithium, a case of using for example, a magnesium compound, a calcium compound, or a barium compound, and a case of using particularly a magnesium compound and/or a calcium compound, a use amount of the polymerization catalyst as an amount of metal atoms of a compound containing the metal is preferably 0.1 µmol or more, more preferably 0.3 µmol or more, and particularly preferably 0.5 µmol or more per 1 mol of all dihydroxy compounds used in the reaction. In addition, as an upper limit, 10 µmol or less is preferable, 5 µmol or less is more preferable, and 3 µmol or less is particularly preferable.

By adjusting the use amount of the polymerization catalyst in the above range, since polymerization speed can be raised, a polycarbonate resin having a desired molecular weight can be obtained without necessarily raising polymerization temperature, so that deterioration of color tone of the polycarbonate resin (A) can be inhibited. In addition, since it can be prevented that unreacted raw materials volatilize during the polymerization and a molar ratio of the dihydroxy compound to the carbonic acid diester collapses, the desired molecular weight of resin can be obtained more certainly. Further, since concurrence of a side reaction can be inhibited, the deterioration of color tone of the polycarbonate resin (A) or coloration at the time of molding process can be further prevented.

Among metal of Group 1, when considering a bad effect that sodium, potassium, or cesium gives to the color tone of the polycarbonate resin, or a bad effect that iron gives to the color tone of the polycarbonate resin, a total content of sodium, potassium, cesium, and iron in the polycarbonate resin (A) is preferably 1 ppm by weight or below. In this case, deterioration of the color tone of the polycarbonate resin can be further prevented, and the color tone of the polycarbonate resin can be further improved. From the same viewpoint, the total content of sodium, potassium, cesium, and iron in the polycarbonate resin (A) is more preferably 0.5 ppm by weight or below. In this connection, the metals are not only from the used catalyst, and sometimes are mixed from raw materials a reaction device. Regardless of the source, a total amount of compounds of the metals in the polycarbonate resin (A) is preferably in the above range as the total content of sodium, potassium, cesium, and iron.

The dihydroxy compound and carbonic acid ester which are raw materials are preferably mixed uniformly before an ester exchange reaction. The mixing temperature is in a range of generally 80° C. or higher, and preferably 90° C. or higher, and generally 250° C. or lower, preferably 200° C. or lower, and further preferably 150° C. or lower, wherein 100° C. or higher and 120° C. or lower is ideal. In this case, it is possible to raise dissolution speed or improve solubility sufficiently, and problems of solidification and the like can be avoided sufficiently. Further, in this case, since heat deterioration of the dihydroxy compound can be inhibited sufficiently, consequently, the color tone of the obtained polycarbonate resin (A) can be improved, and the weather resistance can also be improved.

An operation of mixing the dihydroxy compound and the carbonic acid ester as raw materials is preferably conducted in an atmosphere where an oxygen concentration is 10 vol % or lower, further 0.0001 to 10 vol %, especially 0.0001 to 5 vol %, and particularly 0.0001 to 1 vol %. In this case, the color tone can be improved, and reactivity can be improved.

In order to obtain the polycarbonate resin (A), it is preferable to use carbonic acid ester in a molar ratio of 0.90 to 1.20 to all dihydroxy compounds used in the reaction. In this case, since increase of a hydroxyl group end amount of the polycarbonate resin (A) can be inhibited, thermal stability of the polymer can be improved. Therefore, it is possible to further prevent coloration at the time of molding and improve speed of the ester exchange reaction. In addition, the desired polymer can be obtained more certainly. Further, by adjusting a use amount of carbonic acid ester in the above range, speed decrease of the ester exchange reaction can be inhibited, and more certain production of the polycarbonate resin (A) having a desired molecular weight is possible. In addition, in this case, since increase in a thermal history at the time of reaction can be inhibited, the color tone and weather resistance of the polycarbonate resin (A) can be further improved. Further, in this case, an amount of residual carbonic acid ester in the polycarbonate resin (A) can be reduced, and contamination at the time of molding or generation of odor can be avoided or alleviated. From the viewpoint same as the above, a use amount of carbonic acid ester in a molar ratio to all dihydroxy compounds is more preferably from 0.95 to 1.10.

A method of polycondensating the dihydroxy compound and the carbonic acid ester is conducted in multiple steps by using a plurality of reactors in the presence of the above catalyst. A form of the reaction includes methods of a batch type, a continuous type, or a combination of a batch type and a continuous type, but it is preferable to use a continuous method since a polycarbonate resin in a shorter thermal history is obtained and productivity is excellent.

From the viewpoint of control of polymerization speed or a polymerization quality of the obtained polycarbonate resin (A), it is important to suitably select jacket temperature and internal temperature, and pressure in the reaction system according to the reaction step. Specifically, in an initial step of the polycondensation reaction, a prepolymer is obtained in relatively low temperature and low vacuum, and in a later step of the reaction, a molecular weight is preferably raised to a predetermined value in relatively high temperature and high vacuum. In this case, it is easy to inhibit distillation of unreacted monomer, and to adjust a molar ratio of the dihydroxy compound to the carbonic acid ester to a desired ratio. As a result, decrease of the polymerization speed can be inhibited. In addition, a polymer having a desired molecular weight and an end group can be obtained more certainly.

In addition, the polymerization speed in the polycondensation reaction is controlled by balance between a hydroxy group end and a carbonate group end. Therefore, when balance of the end group changes according to the distillation of unreacted monomer, it is difficult to certainly control the polymerization speed, and there is a risk that a molecular weight of the obtained resin changes a lot. Since the molecular weight of the resin correlates with the melt viscosity, in case of melt processing of the obtained resin, the melt viscosity changes, and it is difficult to certainly maintain quality of a molded product. Such a problem is particularly easy to occur in a case where the polycondensation reaction is carried out by the continuous method.

To inhibit an amount of the distilled unreacted monomer, it is effective to use a reflux cooler in a polymerization reactor, and a high effect is shown particularly in the initial step of reaction where there are many unreacted monomers. Temperature of a refrigerant introduced to the reflux cooler can be suitably selected according to the used monomer, but usually the temperature of a refrigerant introduced to the reflux cooler is from 45~180° C., preferably from 80~150° C., and particularly preferably from 100~130° C. in an inlet of the reflux cooler. By adjusting the ranges of refrigerant temperature, an reflux amount is raised sufficiently and an effect thereof is obtained sufficiently, and an distillation efficiency of a monohydroxy compound to be removed by distillation can be improved sufficiently. As a result, reduction of reactivity can be prevented, and coloration of the obtained resin can be further prevented. Warm water, vapor, and heat medium oil are used as the refrigerant, wherein vapor and heat medium oil are preferable.

In order to improve color tone of the obtained polycarbonate resin (A) with maintaining the polymerization speed suitably and inhibiting distillation of monomer, it is important to select a type and amount of the polymerization catalyst.

The polycarbonate resin (A) is usually produced through a process of two steps or more by using a polymerization catalyst. The polycondensation reaction may be performed in a process of two steps or more by changing a sequential condition, but from the viewpoint of production efficiency, is preferably performed in multiple steps by changing conditions respectively with using a plurality of reactors.

From the viewpoint of performing the polycondensation reaction efficiently, in the initial step of the reaction in which monomer contained in reaction liquid is much, it is important to maintain a necessary polymerization speed and inhibit volatilization of the monomer. In addition, in the later step of the reaction, it is important to shift balance to the polycondensation reaction side by sufficiently distilling off the monohydroxy compound produced as a by-product. Therefore, a reaction condition suitable for the initial step of the reaction and a reaction condition suitable for the later step of the reaction are usually different. Accordingly, by using a plurality of reactors arranged in series, respective conditions can be changed easily, and production efficiency can be improved.

As described above, there may be at least two polymerization reactors used in production of the polycarbonate resin (A), but three or above, preferably three to five, and particularly preferably four from the viewpoint of production efficiency and the like. As long as there are two or more polymerization reactors, a plurality of different reaction steps of further conditions may be performed or temperature and pressure may be changed continuously in each polymerization reactor.

The polymerization catalyst can be added to a raw material preparation tank and a raw material storage tank, and can also be added directly to a polymerization reactor. From the viewpoint of stability of supply and control of a polycondensation reaction, a catalyst supply line is established during a previous raw material line supplied to the polymerization reactor, and it is preferable to supply a polymerization catalyst in aqueous solution.

By adjusting temperature of the polycondensation reaction, improvement of productivity and increase of a thermal history to an article can be avoided. Further, volatilization of monomer, decomposition and coloration of the polycarbonate resin (A) can be further prevented. Specifically, the following condition can be used as a reaction condition in the first grade of reaction. Specifically, the highest internal temperature of the polymerization reactor is set in a range of usually from 150 to 250° C., preferably from 160 to 240° C., and further preferably from 170 to 230° C. In addition, pressure of the polymerization reactor (hereinafter, pressure shows absolute pressure.) is set in a range of usually from 1 to 110 kPa, preferably from 5 to 70 kPa, and further preferably from 7 to 30 kPa. In addition, reaction time is set in a range of usually from 0.1 to 10 hours, and preferably from 0.5 to 30 hours. The first grade of reaction is preferably conducted while the generated monohydroxy compound is distilled off the reaction system.

After the second grade, pressure of the reaction system is lowered slowly from pressure of the first grade of reaction, and while the continuously generated monohydroxy compound is removed off the reaction system, finally the pressure of the reaction system (absolute pressure) is preferably 1 kPa or below. In addition, the highest internal temperature of the polymerization reactor is set in a range of usually from 200 to 260° C., and preferably from 210 to 250° C. In addition, the reaction time is set in a range of usually from 0.1 to 10 hours, preferably from 0.3 to 6 hours, and particularly preferably from 0.5 to 3 hours.

From the viewpoint that a polycarbonate resin (A) having further inhibited coloration and heat deterioration and further improved color tone is obtained, it is preferable that the highest internal temperature of the polymerization reactor in all reaction steps is from 210~240° C. In addition, in order to inhibit polymerization speed reduction of the last half reaction and minimize deterioration due to the thermal history, a horizontal reactor excellent in a plug flow property and an interface renewing property at the final step of polycondensation reaction is preferably used.

In continuous polymerization, to control a molecular weight of the finally obtained polycarbonate resin (A) to a certain level, the polymerization speed is preferably adjusted as necessary. In that case, there is a method having good operability in adjusting pressure of the polymerization reactor at the final step.

In addition, since the polymerization speed according to a ratio of the hydroxy group end to the carbonate group end as described above changes, one end group is reduced to inhibit the polymerization speed, and in that situation, it is possible to reduce residual components having low molecular weight in the resin such as a monohydroxy compound by maintaining pressure of the polymerization reactor of the final step in a high vacuum. However, in this case, when one end is too few, reactivity reduces extremely only by changing end group balance a little, and the molecular weight of the obtained polycarbonate resin (A) may be less than the desired molecular weight. To avoid such a problem, the polycarbonate resin (A) obtained in the polymerization reactor at the final step preferably contains 10 mol/ton or above of a hydroxy group end and a carbonate group end. On the other hand, when both end groups are too many, polymerization speed is fast and the molecular weight is too high, so one end group is preferably 60 mol/ton or less.

In this way, by adjusting an amount of the end group and pressure of the polymerization reactor at the final step in a preferable range, a residual amount of the monohydroxy compound in the resin in an outlet of the polymerization reactor can be reduced. The residual amount of the monohydroxy compound in the resin in an outlet of the polymerization reactor is preferably 2,000 ppm by weight or less, more preferably 1,500 ppm by weight or less, and further preferably 1,000 ppm by weight or less. Like this, by reducing a content of the monohydroxy compound in an outlet of the polymerization reactor, devolatilization of the monohydroxy compound and the like can be easily performed in the later process.

Although it is preferable that the residual amount of the monohydroxy compound is small, in case of reduction to lower than 100 ppm by weight, it is necessary to adjust an operation condition that the amount of one end group reduces extremely and the pressure of the polymerization reactor is maintained in a high vacuum. In this case, as described above, since it is difficult to maintain a molecular weight of the obtained polycarbonate resin (A) at a certain level, the molecular weight is usually 100 ppm by weight or more, and preferably 150 ppm by weight or more.

From the viewpoint of resource effective utilization, after refined as necessary, the monohydroxy compound produced as a by-product is preferably reused as a raw material of another compound. For example, in a case where the monohydroxy compound is phenol, raw materials such as diphenyl carbonate, bisphenol, and the like can be used.

[Physical Properties of Polycarbonate Resin (A)]
<Glass Transition Temperature>

Glass transition temperature of the polycarbonate resin (A) is preferably 90° C. or higher. In this case, balance between the heat resistance and the biological origin material content rate of the polycarbonate resin composition can be improved. From the same viewpoint, the glass transition temperature of the polycarbonate resin (A) is preferably 100° C. or higher, further preferably 110° C. or higher, and particularly preferably 120° C. or higher. On the other hand, the glass transition temperature of the polycarbonate resin (A) is preferably 170° C. or lower. In this case, melt viscosity can be reduced due to the above melt polymerization, and a polymer having a sufficient molecular weight can be obtained. In addition, in a case where the molecular weight was increased by increasing polymerization temperature and lowering melt viscosity, since heat resistance of the constitution unit (a) is not sufficient, there is a risk of easy coloration. From the viewpoint that increase of molecular weight and prevention of coloration can be improved in a better balance, the glass transition temperature of the polycarbonate resin (A) is more preferably 165° C. or lower, further preferably 160° C. or lower, particularly preferably 150° C. or lower, and most preferably lower than 145° C.
<Reduced Viscosity>

The molecular weight of the polycarbonate resin (A) can be shown in reduced viscosity, and the higher reduced viscosity shows the larger molecular weight. The reduced viscosity is usually 0.30 dL/g or higher, and preferably 0.33 dL/g or higher. In this case, mechanical strength of the molded product can be further improved. On the other hand, the reduced viscosity is usually 1.20 dL/g or lower, more preferably 1.00 dL/g or lower, and further preferably 0.80 dL/g or lower. In these cases, flowability at the time of molding can be improved, and productivity and moldability can be further improved. In this connection, the reduced viscosity of the polycarbonate resin (A) uses a value measured by a Ubbelohde viscosity pipet under a condition of a temperature of 20.0° C.±0.1° C. with using a solution prepared by taking methylene chloride as a solvent and precisely adjusting the concentration of the resin composition to 0.6 g/dL. Details of a method for measuring the reduced viscosity will be described in Examples.
<Melt Viscosity>

Melt viscosity of the polycarbonate resin (A) is preferably 400 Pa·s or higher and 3,000 Pa·s or lower. In this case, a molded product of the resin composition is prevented from being brittle, and mechanical characteristics can be further improved. Further, in this case, flowability at the time of a molding process is improved, and it can be prevented that appearance of the molded product is ruined, or dimension accuracy deteriorates. Further, in this case, coloration and foaming due to rise of resin temperature via shear heat generation can be further prevented. From the same viewpoint, the melt viscosity of the polycarbonate resin (A) is more preferably 600 Pa·s or higher and 2,500 Pa·s or lower, further preferably 800 P·s or higher and 2,000 Pa·s or lower. In this connection, the melt viscosity in this specification is measured using a capillary rheometer [manufactured by Toyo Seiki Co., Ltd.], and refers to melt viscosity under temperature of 240° C. and shear speed of 91.2 sec$^{-1}$. Details of a method for measuring the melt viscosity will be described in the following Examples.

The polycarbonate resin (A) preferably contains a catalyst deactivating agent. The catalyst deactivating agent is an acidic substance and is not particularly limited as long as it has a deactivating function of the polymerization catalyst, and examples thereof can include phosphoric acid, trimethyl phosphate, triethyl phosphate, phosphorous acid, tetrabutylphosphonium octylsulphonate, tetramethylphosphonium benzenesulfonate, tetrabutylphosphonium benzenesulfonate, tetrabutylphosphonium dodecylbenzenesulfonate, phosphonium salts such as p-tetrabutylphosphonium toluenesulfonate; ammonium salts such as tetramethylammonium decylsulfonate, tetrabutylammonium dodecylbenzenesulfonate; and methyl benzenesulfonate, butyl benzenesulfonate, methyl p-toluenesulfonate, butyl p-toluenesulfonate, alkyl esters such as ethyl hexadecyl sulfonate, and the like.

The catalyst deactivating agent preferably contains a phosphorus compound (refer to "specific phosphorus compound" below) containing any one of partial structure represented by the following structural formula (5) or the following structural formula (6). The specific phosphorus compound deactivates a polymerization catalyst described later by addition at the time of for example, a kneading and mixing process or a pelletizing process after completion of a polycondensation reaction, and then the polycondensation reaction can be inhibited from proceeding unnecessarily. As a result, polycondensation can be inhibited from proceeding when the polycarbonate resin (A) is heated in a molding process, and detachment of the monohydroxy compound can be inhibited. In addition, coloration of the polycarbonate resin (A) at high temperature can be further inhibited by deactivating the polymerization catalyst.

[Chemical Formula 8]

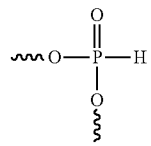

(5)

[Chemical Formula 9]

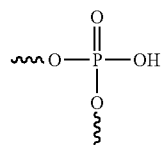

(6)

Phosphoric acid, phosphorous acid, phosphonic acid, hypophosphorous acid, polyphosphoric acid, phosphonic acid ester, acidic phosphoric acid ester, and the like can be used as the specific phosphorus compound containing a partial structure represented by the structural formula (5) or structural formula (6). In the specific phosphorus compound, phosphorous acid, phosphonic acid, and phosphonic acid ester are further excellent in effects of catalyst deactivation and coloration inhibition, preferably phosphorous acid in particular.

For example, the following compounds can be used as phosphonic acid. Phosphonic acid (phosphorous acid), methylphosphonic acid, ethylphosphonic acid, vinylphosphonic acid, decylphosphonic acid, phenylphosphonic acid, benzylphosphonic acid, aminomethylphosphonic acid, methylenediphosphonic acid, 1-hydroxyethane-1,1-diphosphonic acid, 4-methoxyphenylphosphonic acid, nitrilotris (methylenephosphonic acid), propylphosphonic acid anhydride, and the like.

For example, the following compounds can be used as phosphonic acid ester. Dimethyl phosphonate, diethyl phosphonate, bis(2-ethylhexyl) phosphonate, dilauryl phosphonate, dioleyl phosphonate, diphenyl phosphonate, dibenzyl phosphonate, dimethyl methylphosphonate, diphenyl methylphosphonate, diethyl ethylphosphonate, diethyl benzylphosphonate, dimethyl phenylphosphonate, diethyl phenylphosphonate, dipropyl phenylphosphonate, diethyl (methoxymethyl) phosphonate, diethyl vinylphosphonate, diethyl hydroxymethylphosphonate, dimethyl (2-hydroxyethyl) phosphonate, diethyl p-methylbenzylphosphonate, diethylphosphonoacetic acid, ethyl diethylphosphonoacetate, tert-butyl diethylphosphonoacetate, diethyl (4-chlorobenzyl) phosphonate, diethyl cyanophosphonate, diethyl cyanomethylphosphonate, diethyl 3,5-di-tert-butyl-4-hydroxybenzyl phosphonate, diethylphosphonoacetaldehyde diethyl acetal, diethyl (methylthiomethyl) phosphonate, and the like.

For example, the following compounds can be used as acidic phosphonic acid ester. Phosphate diesters such as dimethyl phosphate, diethyl phosphate, divinyl phosphate, dipropyl phosphate, dibutyl phosphate, bis(butoxyethyl) phosphate, bis(2-ethylhexyl) phosphate, diisotridecyl phosphate, dioleyl phosphate, distearyl phosphate, diphenyl phosphate, and dibenzyl phosphate, or mixtures of diesters and monoesters, diethyl chlorophosphate, zinc stearyl phosphate, and the like.

The specific phosphorus compound may be used alone or in any combination of two or more.

A content of the specific phosphorus compound in the polycarbonate resin (A) is preferably 0.1 ppm by weight or higher and 5 ppm by weight or lower as phosphorus atom. In this case, effects of catalyst deactivation and coloration inhibition due to the specific phosphorus compound can be obtained sufficiently. In addition, in this case, in an endurance test particularly under high temperature and high humidity, coloration of the polycarbonate resin (A) can be further prevented.

In addition, effects of catalyst deactivation and coloration inhibition can be obtained more certainly by adjusting a content of the specific phosphorus compound according to an amount of the polymerization catalyst. A content of the specific phosphorus compound is preferably 0.5 time mol or more and 5 time mol or less, more preferably 0.7 time mol or more and 4 time mol or less, and particularly preferably 0.8 time mol or more and 3 time mol or less as an amount of phosphorus atom to 1 mol of the metal atom of the polymerization catalyst.

[Polyrotaxane (B)]

Polyrotaxane in the present invention refers to a molecule in which the opening part of a cyclic molecule is penetrated in a skewered state by a linear molecule, and blocking groups are arranged on both ends (both ends of the linear molecule) of pseudopolyrotaxane in which the cyclic molecule includes the linear molecule so that the cyclic molecule is not isolated from the linear molecule.

<Linear Molecule>

The linear molecule is included in the cyclic molecule and can combine with the cyclic molecule in a non-covalent bond, and may be any macromolecule as long as it has a molecular weight described later.

Here, "linear" in "linear molecule" means "straight chain" substantiality. Namely, the linear molecule may have a branch chain as long as the cyclic molecule which is a rotor is rotatable or the cyclic molecule is slidable or movable on the linear molecule. In addition, the length of "straight chain" is not particularly limited as long as the cyclic molecule is slidable or movable on the linear molecule.

In addition, "linear" in "linear molecule" depends on relationship with polyrotaxane material relatively. Namely, in a case of material having a cross-link structure, the linear molecule may be a small part in the material. As described above, even length of a small part is not particularly limited as long as the cyclic molecule is slidable or movable on the linear molecule.

Any of a hydrophilic polymer and a hydrophobic polymer can be used as the linear molecule. Examples of the hydrophilic polymer can include polyvinyl alcohol or polyvinyl pyrrolidone, poly(meth)acrylic acid, cellulose resins (carboxymethyl cellulose, hydroxyethyl cellulose, hydroxypropyl cellulose, and the like), polyacrylamide, polyethylene oxide, polyethylene glycol, polypropylene glycol, a polyvinyl acetal resin, polyvinyl methyl ether, polyamine, polyethyleneimine, casein, gelatin, starch and the like and/or copolymers thereof, and the like; examples of the hydrophobic polymer include a polyolefin resin such as polyethylene, polypropylene, and a copolymer resin with other olefinic monomers, a polyester resin, a polyvinyl chloride resin, a polystyrene resin such as a polystyrene and acrylonitrile-styrene copolymer resin, a polymethyl methacrylate and (meth)acrylic ester copolymer, an acrylic resin such as an acrylonitrile-methyl acrylate copolymer resin, a polycarbonate resin, a polyurethane resin, a vinyl chloride-vinyl acetate copolymer resin, a polyvinyl butyral resins, and the like; and derivatives or modifications thereof. Besides this, it is also possible to use polyisobutylene, polytetrahydrofuran, polyaniline, acrylonitrile-butadiene-styrene copolymer (ABS resin), polyamides such as nylon, polyimides, polydienes such as polyisoprene and polybutadiene, polysiloxanes such as polydimethylsiloxane, polysulfones, polyimines, polyacetic anhydrides, polyureas, polysulfides, polyphosphazenes, polyketones, polyphenylenes, polyhaloolefins, and derivatives thereof and the like.

Among these, polyethylene glycol, polyisoprene, polyisobutylene, polybutadiene, polypropylene glycol, polytetrahydrofuran, polydimethylsiloxane, polyethylene, and polypropylene are preferable. It is preferable to be polyethylene glycol particularly.

A preferable molecular weight of the linear molecule is 10,000 or larger, preferably 20,000 or smaller, and more preferably 35,000 or larger in number average molecular weight.

The linear molecule preferably has reaction groups on both ends thereof. Since the linear molecule has the reaction groups, it is possible to react easily with a blocking group. The reaction group depends on the blocking group to be used, and examples thereof can include a hydroxyl group, an amino group, a carboxyl group, a thiol group and the like.

The blocking group is not particularly limited and any group may be used as long as it is a group maintaining a form in which the cyclic molecules are skewered by the linear molecules. Examples of such a group can include a group having "bulkiness" and/or a group having "ionicity". Here, the "group" means various groups including a molecular group and a macro molecular group. Namely, a group having "bulkiness" may be a group represented by sphere or a solid support represented as a side wall schematically. In addition, since "ionicity" of the group having "ionicity" and "ionicity" of the cyclic molecule affect each other, for example, rebound each other, the cyclic molecule can maintain a form in which it is skewered by the linear molecules.

Examples of the blocking group can include dinitrophenyl groups such as 2,4-dinitrophenyl group and 3,5-dinitrophenyl group, cyclodextrins, adamantane groups, trityl groups, fluoresceins and pyrenes, and derivatives or modifications thereof. More specifically, even in a case of using α-cyclodextrin as a cyclic molecule and polyethylene glycol as a linear molecule, examples of the blocking group can include cyclodextrins, dinitrophenyl groups such as 2,4-dinitrophenyl group and 3,5-dinitrophenyl group, adamantane groups, trityl groups, fluoresceins and pyrenes, and derivatives or modifications thereof.

<Cyclic Molecule>

The cyclic molecule is not particularly limited as long as it is included in the linear molecule and achieve a pulley effect, and can include various cyclic substances. In addition, it is sufficient as long as the cyclic molecule is substantially cyclic, and as a "C" shape, it is not always necessary to be an absolutely closed circular.

In this connection, in the cyclic molecule, in a range which does not impair the effect of the present invention, at least one position or more of the outer peripheral part of the molecule may be substituted (a side chain of the cyclic molecule). A specific cyclic molecule may be a cyclodextrin molecule which may have a functional group on the side chain, and the cyclodextrin molecule may be selected from the group consisting of α-cyclodextrin, β-cyclodextrin and γ-cyclodextrin, and derivatives thereof. In addition, examples of the functional group on the end of the side chain can include a hydroxyl group, an amino group, a carboxyl group, a thiol group and the like.

When the pseudo-polyrotaxane is prepared, it is preferable to control an amount of the cyclic molecule penetrated in a skewered state by the linear molecule. It is preferable that at least two cyclic molecules are penetrated in a skewered state by the linear molecule, and at least two cyclic molecules include the linear molecule. In addition, an amount of the cyclic molecule which can be present at the maximum on the linear molecule, that is an amount of the cyclic molecule in a case where the maximum inclusion amount is 1, preferably present in a value of 0.001 to 0.6, preferably 0.01 to 0.5, and more preferably 0.05 to 0.4 of the maximum inclusion amount.

The polyrotaxane preferably contains polyethylene glycol as a linear molecule and a cyclodextrin molecule as a cyclic molecule, and specifically, is preferably a polyrotaxane in which the cyclodextrin molecule which may have a functional group on the side chain, particularly α-cyclodextrin, arranges a blocking group (adamantane group, dinitrophenyl group, and the like) on a pseudopolyrotaxane including polyethylene glycol.

[Physical Properties of Polyrotaxane (B)]
<Molecular Weight>

An overall molecular weight of polyrotaxane is not particularly limited, and is preferably 100,000 or larger, and further preferably 300,000 or larger as a lower limit in number average molecular weight measured via a GPC method. On the other hand, the upper limit is preferably 1 million or below, and further preferably 700,000 or lower.

[Polycarbonate Resin Composition and Physical Properties Thereof]

The polycarbonate resin composition of the present invention contains at least the polycarbonate resin (A) and polyrotaxane (B). As long as the polycarbonate resin composition is in a state where the polycarbonate resin (A) and the polyrotaxane (B) are mixed up with each other, the effect of the present invention is achieved sufficiently, and in order to utilize characteristics of the polyrotaxane (B) at the maximum, or in order to improve compatibility of the resin with each other, a state where the polycarbonate resin (A) preferably reacts with a functional group of a cyclic molecule of the polyrotaxane (B) and the polycarbonate resin (A) is bonded with the polyrotaxane (B) is preferable.

In addition, the polycarbonate resin composition of the present invention may use a polymer alloy further mixing one or more kinds of the above polycarbonate resin (A) which are different from the used polycarbonate resin (A).

In addition, in a case where a polycarbonate resin consisting of only an aromatic dihydroxy compound in the present invention is used, in comparison with a polycarbonate resin having a constitution unit derived from a dihydroxy compound represented by the formula (1), although it is known that the polycarbonate resin is generally excellent in mechanical characteristics but inferior in surface hardness and the like, excoriation resistance can be improved by making the resin composition of the present invention.

[Physical Properties of Polycarbonate Resin Composition]
[Total Light Transmittance]

For the polycarbonate resin composition, total light transmittance in a thickness direction of the molded body having thickness of 2 mm which molds the polycarbonate resin composition is preferably 55% or higher, more preferably 70% or higher, and further preferably 80% or higher.

<Glass Transition Temperature>

In the polycarbonate resin composition, it is preferable that a peak of the measured glass transition temperature by a DSC method is single. In addition, the glass transition temperature of the polycarbonate resin composition is preferably 100° C. or higher and 200° C. or lower. In this case, since heat resistance can be further improved, deformation of the molded product can be further prevented. In addition, in this case, heat deterioration of the polycarbonate resin (A) when producing the resin composition can be further inhibited, and the impact resistance can be further improved. Further, heat deterioration of the resin composition at the time of molding can be further inhibited. From the same viewpoint, the glass transition temperature of the polycarbonate resin composition is more preferably 110° C. or higher and 190° C. or lower, and further preferably 120° C. or higher and 180° C. or lower.

The polycarbonate resin composition showing the predetermined total light transmittance and glass transition temperature contains the polycarbonate resin (A), polyrotaxane (B), and a specific compound described later, and this can be realized by adjusting the content of compound (C) to a predetermined range described later.

A lower limit of a compounding amount of the polyrotaxane (B) in the polycarbonate resin composition of the present invention is 0.1 part by weight or more, preferably 1 part by weight or more, and more preferably 2 parts by weight or more, per 100 parts by weight of a total amount of the polycarbonate resin (A) and the polyrotaxane (B). When the compounding amount of the polyrotaxane (B) is less than the above amount, since a pulley effect of the polyrotaxane decreases to lower mechanical characteristics, a desired effect is not obtained. On the other hand, an upper limit of the compounding amount of the polyrotaxane (B) is preferably smaller than 40 parts by weight per 100 parts by weight of the total amount of the polycarbonate resin (A) and the polyrotaxane (B). From a viewpoint of compatibility of the polycarbonate resin (A) and the polyrotaxane (B) obtained more than the compounding amount, deterioration of transparency and color tone of the resin composition is caused, and not only transparency and color tone of the polycarbonate resin composition are damaged, but handling of the resin composition itself also becomes difficult, resulting in poor moldability. The upper limit of the compounding amount of the polyrotaxane (B) is preferably 30 parts by weight or below, more preferably less than 20 parts by weight, further preferably 15 parts by weight or below, and particularly preferably 10 parts by weight or below. In the above range, transparency is maintained, and mechanical properties of break elongation and impact resistance can be improved.

In the present invention, the compounding amount of the polyrotaxane (B) in the polycarbonate resin composition is preferably 0.1 parts by weight or larger and smaller than 20 parts by weight specifically per 100 parts by weight of the total amount of the polycarbonate resin (A) and the polyrotaxane (B).

In a case where a sum of melt viscosity of the polycarbonate resin (A) and melt viscosity of the polyrotaxane (B) multiplied by respective weight ratios was determined as ideal melt viscosity, the melt viscosity of the polycarbonate resin composition is preferably 40% or more with respect to the ideal melt viscosity. In this case, impact strength can be further improved. From the same viewpoint, the melt viscosity of the polycarbonate resin composition is more preferably 60% or more, and particularly preferably 80% or more for ideal melt viscosity. In this connection, the melt viscosity is measured with using a capillary rheometer

[manufactured by Toyo Seiki Co., Ltd.], and refers to melt viscosity under temperature of 240° C. and shear speed of 91.2 sec$^{-1}$. Details of a method for measuring the melt viscosity will be described in the following Examples.

Tensile elongation of the polycarbonate resin composition can be evaluated in a tensile elongation test described in detail in Examples disclosed later. The tensile elongation is preferably 11% or more, more preferably 14% or more, and further preferably 16% or more.

Impact strength of the polycarbonate resin composition, for example, can be evaluated in a notched Charpy impact strength test described in detail in Examples disclosed later. The notched Charpy impact strength is preferably 10 kJ/m$^2$ or larger, more preferably 20 kJ/m$^2$ or larger, further preferably 30 kJ/m$^2$ or larger, and particularly preferably 40 kJ/m$^2$ or larger. In this range, the polycarbonate resin composition has excellent impact resistance strength.

[Compound (C)]

The polycarbonate resin composition of the present invention may further contain the following compound (C) described in detail in addition to the polycarbonate resin (A) and polyrotaxane (B). The compound (C) to be compounded to the polycarbonate resin composition can promote an ester exchange reaction between the polycarbonate resin (A) and polyrotaxane (B). The ester exchange reaction occurs by heating at the time of kneading for example, the polycarbonate resin (A) and the polyrotaxane (B) in production of the resin composition, and is promoted by the compound (C). As a result, since compatibility between the polycarbonate resin (A) and the polyrotaxane (B) in the resin composition increases, transparency of the resin composition can be raised. Further, a resin composition which has high transparency and is excellent in characteristics such as heat resistance, moist heat resistance, and impact resistance can be realized. The compound (C) may be any compound as long as it contains at least one selected from the group consisting of metal of Group 1 and metal of Group 2.

Examples of metal in the compound (C) include lithium, sodium, potassium, rubidium, cesium, beryllium, magnesium, calcium, strontium, barium, and the like. Above all, sodium, potassium, magnesium, calcium, and cesium are preferable, and a compound containing at least one selected from the group consisting of a sodium compound, a potassium compound, a magnesium compound, a calcium compound, and a cesium compound is preferable.

Metal in the compound (C) has electronegativity of preferably from 0.7 to 1.1, more preferably from 0.75 to 1.0, and further more preferably from 0.75 to 0.98. Specifically, cesium (0.79), potassium (0.82), sodium (0.93), lithium (0.98), barium (0.89), strontium (0.95), and calcium (1.0) are included. Numerical values in the brackets are electronegativity. By using metal having electronegativity in the above range, the transparency of the polycarbonate resin composition can be further improved, and the impact resistance can be further improved.

Examples of the compound (C) can include metal salt consisting of the above metal and organic acids such as carboxylic acid, carbonic acid, and phenol, nitric acid, phosphoric acid, boric acid, and the like. In addition, examples of metal salt also include halide, hydroxide, and the like. In the present invention, it is more preferable that the compound (C) is at least one selected from the group consisting of an inorganic salt (including carbonate), a carboxylate, a phenolate, a halogen compound, and a hydroxide.

It is preferable that acid dissociation constant (pKa) of a counter ion of a metal ion in the compound (C) is 2 to 16.

In this case, a catalyst amount in metal conversion is not increased, and it is possible to improve the transparency of the polycarbonate resin composition and to further prevent deterioration of the color tone. From the same viewpoint, it is more preferable that acid dissociation constant (pKa) of a counter ion of a metal ion in the compound (C) is 3 to 11, and particularly preferably 5 to 10.

For example, the following compounds can be used as the compound of metal of Group 1 used as the compound (C). Sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, phenylated boron sodium, phenylated boron potassium, phenylated boron lithium, phenylated boron cesium, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholate of sodium, potassium, lithium and cesium, phenolate, disodium salt, dipotassium salt, dilithium salt, and dicesium salt of bisphenol A, and the like.

Among them, from the viewpoint of further improving transparency, color tone, and moist heat resistance, at least one selected from the group consisting of a sodium compound, a potassium compound, and a cesium compound is preferable, and a potassium compound and/or a cesium compound are more preferable. Potassium hydrogencarbonate, cesium hydrogen carbonate, potassium carbonate, cesium carbonate, potassium acetate, cesium acetate, potassium stearate, cesium stearate are particularly preferable.

As the compound of metal of Group 2 used as the compound (C), for example, the following compounds can be used. Calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the like. Even among them, the calcium compound is preferable from a viewpoint that the transparency and color tone is further improved. Particularly preferable are calcium hydroxide, calcium hydrogencarbonate, and calcium acetate.

A content of the compound (C) contained in the polycarbonate resin composition per 100 parts by weight of the total amount of the polycarbonate resin (A) and the polyrotaxane (B) is preferably 0.5 ppm by weight or more and 1,000 ppm by weight or less in a metal amount in the compound (C). Depending on metal species, when the content exceeds 1,000 ppm by weight, the color tone of the resin composition deteriorates, and the moist heat resistance decreases. If the content is less than 0.5 ppm by weight, the transparency of the resin composition is insufficient. From the viewpoint that the color tone, heat resistance, and transparency are further improved, the metal amount in the compound (C) is more preferably 0.9 ppm by weight or more and 100 ppm by weight or less, and particularly preferably 1 ppm by weight or more and 10 ppm by weight or less. In this connection, because there are many cases where the compound (C)

which is introduced as a polymerization catalyst of the polycarbonate resin (A) which is a raw material into the polycarbonate resin composition is generally deactivated by an acidic compound as p-butyl toluenesulfonate for example, after the polymerization process, it is preferable to add a separate compound (C) as described later. The compound (C) contained in the polycarbonate resin composition is a compound containing both the polymerization catalyst corresponding to the compound (C) brought into the resin composition from various resins (A) used in production of the polycarbonate resin (A) and the compound (C) added separately in production of the resin composition.

In a method of adding the compound (C), solid things may be supplied as solid, and soluble things in water or a solvent may be supplied as an aqueous solution or solution. In addition, the compound (C) may be added to polycarbonate resin raw materials, and in a case of an aqueous solution or solution, the compound (C) may be input from a raw material input port of an extruder, or liquid may be added from a cylinder using a pump or the like.

[Other Addictives]

Other various addictives can be added to the polycarbonate resin (A) or the polycarbonate resin composition. The addictives include an acidic compound, a dye or pigment, an antioxidant, a UV absorbent, a light stabilizer, a release agent, a heat stabilizer, a flame retardant, a flame retardant aid, an inorganic filler, an organic filler, an impact modifier, a hydrolysis inhibitor, a foaming agent, a nucleating agent, and the like, and can use addictives generally used in the polycarbonate resin.

(Acidic Compound)

It is preferable that the polycarbonate resin composition further contains an acidic compound. This acidic compound is an acidic compound added in compounding the polycarbonate resin (A) and the polyrotaxane (B), and is an acidic compound which does not contain the above catalyst deactivating agent used in production of the polycarbonate resin (A) and the polyrotaxane (B). These catalyst deactivating agents are because their effect itself is lost at the production step of the polycarbonate resin (A) and the polyrotaxane (B). In this connection, a substance same as the above catalyst deactivating agent can be used as an acidic compound.

An addition amount of the acidic compound is preferably 0.5 times of mole or more and 5 times of mole or less for 1 mole of the compound (C) contained in the polycarbonate resin composition. In this case, the moist heat resistance can be further improved, and thermal stability at the time of molding can be further improved. From the same viewpoint, an addition amount of the acidic compound is more preferably 0.6 times of mole or more and 2 times of mole or less, and further preferably 0.7 times of mole or more and 1 times of mole or less for 1 mole of the compound (C).

(Dye or Pigment)

Examples of a dye or pigment include an inorganic pigment, an organic pigment, and an organic dye or pigment such as an organic pigment.

Examples of the inorganic pigment specifically include carbon black; oxide pigments such as titanium oxide, zinc oxide, red iron oxide, chromium oxide, iron black, titanium yellow, zinc-iron brown, copper-chromium black, and copper-iron black.

Specific examples of the organic dye or pigment such as an organic pigment and an organic pigment include phthalocyanine dyes or pigments; condensed polycyclic dyes or pigments such as azo series, thioindigo series, perinone series, perylene series, quinacridone series, dioxazine series, isoindolinone series, quinophthalone series, and the like; dyes or pigments of anthraquinone series, perinone series, perylene series, methine series, quinoline series, heterocyclic series, methyl series, and the like.

One of these dyes or pigments may be used alone, or may be used in combination of two or more.

Among the organic dyes or pigments such as the inorganic pigment, organic pigment, and organic dye, the inorganic pigment is preferable. By using the inorganic pigment as a colorant, even the molded product is used outdoors or the like, sharpness or the like can be maintained for a long period.

An amount of the dyes or pigments is preferably 0.05 part by weight or more and 5 parts by weight or less per 100 parts by weight of the total amount of the polycarbonate resin (A) and the polyrotaxane (B). More preferable is 0.05 part by weight or more and 3 parts by weight or less, and further preferable is 0.1 part by weight or more and 2 parts by weight or less. When an amount of the colorant is less than 0.05 part by weight, and it is difficult to obtain a spun-dyed molded product having sharpness. When it is more than 5 parts by weight, surface asperity of the molded product is large, and it is difficult to obtain a spun-dyed molded product having sharpness.

(Antioxidant)

As an antioxidant, a general antioxidant used in resin can be used, but from the viewpoint of oxidation stability and thermal stability, phosphite antioxidant, sulfur antioxidant, and phenol antioxidant are preferable. Here, an addition amount of the antioxidant is preferably 5 parts by weight or less per 100 parts by weight of the total amount of the polycarbonate resin (A) and the polyrotaxane (B). In this case, it is possible to prevent contamination of a mold during molding more certainly and obtain a molded product more excellent in surface appearance. From the same viewpoint, the addition amount of the antioxidant is preferably 3 parts by weight or less, and further preferably 2 parts by weight or less per 100 parts by weight of the total amount of the polycarbonate resin (A) and the polyrotaxane (B). In addition, an addition amount of the antioxidant is preferably 0.001 parts by weight or more per 100 parts by weight of the total amount of the polycarbonate resin (A) and the polyrotaxane (B). In this case, improvement effects on molding stability can be obtained sufficiently. From the same viewpoint, the addition amount of the antioxidant is preferably 0.002 parts by weight or more, and further preferably 0.005 parts by weight or more per 100 parts by weight of the total amount of the polycarbonate resin (A) and the polyrotaxane (B).

(Phosphite Antioxidant)

Examples of a phosphite antioxidant include triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-methylene bis(4,6-di-tert-butylphenyl) octyl phosphite, bis(nonylphenyl) pentaerythritol diphosphite, bis(2,4-di-tert-butylphenyl) pentaerythritol diphosphite, distearyl pentaerythritol diphosphite, and the like.

Among these, trisnonylphenyl phosphite, tris(2,4-di-tert-butylphenyl) phosphite, bis(2,4-di-tert-butylphenyl) pentaerythritol diphosphite, and bis(2,6-di-tert-butyl-4-methylphenyl) pentaerythritol diphosphite are preferably used. These compounds can be used alone or in combination of two or more.

(Sulfur Antioxidant)

Examples of a sulfur antioxidant can include dilauryl-3,3'-thiodipropionic acid ester, ditridecyl-3,3'-thiodipropionic acid ester, dimyristyl-3,3'-thiodipropionic acid ester, distearyl-3,3'-thiodipropionic acid ester, lauryl stearyl 3,3'-thiodipropionic acid ester, pentaerythritol tetrakis(3-lauryl thiopropionate), bis[2-methyl-4-(3-laurylthiopropionyloxy)-5-tert-butylphenyl] sulfide, octadecyl disulfide, mercaptobenzimidazole, 2-mercapto-6-methylbenzimidazole, 1,1'-thiobis(2-naphthol), and the like. Among the above, pentaerythritol tetrakis(3-lauryl thiopropionate) is preferable. These compounds can be used alone or in combination of two or more.

(Phenol Antioxidant)

Examples of a phenolic antioxidant include compounds such as pentaerythritol tetrakis(3-mercaptopropionate), pentaerythritol tetrakis(3-lauryl thiopropionate), glycerol-3-stearyl thiopropionate, triethylene glycol-bis[(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl) propionate], octadecyl-3-(3,5-di-tert-butyl-4-hydroxyphenyl) propionate, 1,3,5-trimethyl-2,4,6-tris(3,5-di-tert-butyl-4-hydroxybenzyl) benzene, N,N-hexamethylene bis(3,5-di-tert-butyl-4-hydroxy-hydrocinnamide) 3,5-di-tert-butyl-4-hydroxy-benzylphosphonate-diethyl ester, tris(3,5-di-butyl-4-hydroxybenzyl) isocyanurate, 4,4'-biphenylene diphosphinic acid tetrakis(2,4-di-tert-butylphenyl), 3,9-bis{1,1-dimethyl-2-[β-(3-tert-butyl-4-hydroxy-5-methyl-phenyl) propionyloxy] ethyl}-2,4,8,10-tetraoxaspiro (5,5) undecane, 2,6-di-tert-butyl-p-cresol, and 2,6-di-tert-butyl-4-ethylphenol.

Even in these compounds, an aromatic monohydroxy compound substituted by one or more alkyl having a carbon number of five or more is preferable, specifically, octadecyl-3-(3,5-di-tert-butyl-4-hydroxyphenyl) propionate, pentaerythrityl-tetrakis{3-(3,5-di-t-butyl-4-hydroxyphenyl) propionate}, 1,6-hexanediol-bis[3-(3,5-di-tert-butyl-4-hydroxyphenyl) propionate], 1,3,5-trimethyl-2,4,6-tris(3,5-di-tert-butyl-4-hydroxybenzyl) benzene and the like are preferable, and pentaerythrityl-tetrakis{3-(3,5-di-t-butyl-4-hydroxyphenyl) propionate} is further preferable. These compounds can be used alone or in combination of two or more.

(UV Absorbent)

Examples of an ultraviolet absorbent include benzotriazole compounds, benzophenone compounds, triazine compounds, benzoate compounds, hindered amine compounds, salicylic acid phenyl ester compounds, cyanoacrylate compounds, malonic acid ester compounds, oxalic acid anilide compounds, and the like. These may be used alone or in combination of two or more.

More specific examples of the benzotriazole compounds include 2-(2'-hydroxy-3'-methyl-5'-hexylphenyl) benzotriazole, 2-(2'-hydroxy-3'-t-butyl-5'-hexylphenyl) benzotriazole, 2-(2'-hydroxy-3',5'-di-t-butylphenyl) benzotriazole, 2-(2'-hydroxy-3'-methyl-5'-t-dodecylphenyl) benzotriazole, 2-(2'-hydroxy-5'-t-dodecylphenyl) benzotriazole, 2-(2'-hydroxy-3'-methyl-5'-t-dodecylphenyl) benzotriazole, 2-(2'-hydroxy-5'-t-butylphenyl) benzotriazole, methyl-3-[(3-(2H-benzotriazole-2-yl)-5-t-butyl-4-hydroxyphenyl] propionate, and the like.

Examples of the triazine compounds include 2-{4-[(2-hydroxy-3-dodecyloxypropyl) oxy]-2-hydroxyphenyl}-4,6-bis(2,4-dimethylphenyl)-1,3,5-triazine, 2,4-bis(2,4-dimethylphenyl)-6-(2-hydroxy-4-isooctyloxyphenyl)-s-triazine, 2-(4,6-diphenyl-1,3,5-triazine-2-yl)-5-[(hexyl) oxy]-phenol (Tinuvin 1577 FF, manufactured by BASF Japan Co.), and the like.

Examples of the hydroxybenzophenone compounds include 2,2'-dihydroxybenzophenone, 2,2',4,4'-tetrahydroxybenzophenone, 2-hydroxy-4-octoxybenzophenone, and the like.

Examples of the cyanoacrylate compounds include ethyl-2-cyano-3,3-diphenylacrylate, 2'-ethylhexyl-2-cyano-3,3-diphenylacrylate, and the like.

Examples of the malonic acid ester compounds include 2-(1-arylalkylidene) malonic acid esters and the like. Among them, malonic acid [(4-methoxyphenyl)-methylene]-dimethyl ester (Hostavin PR-25, manufactured by Clariant Co.) and 2-(paramethoxybenzylidene) dimethyl malonate are preferable.

Examples of the oxalic acid anilide compounds include 2-ethyl-2'-ethoxy-oxalanilide (Sanduvor VSU, manufactured by Clariant) and the like.

Even among them, 2-(2'-hydroxy-3'-t-butyl-5'-hexylphenyl) benzotriazole, 2-(2'-hydroxy-5'-t-butylphenyl) benzotriazole, 2-{4-[(2-hydroxy-3-dodecyloxypropyl) oxy]-2-hydroxyphenyl}-4,6-bis (2,4-dimethylphenyl)-1,3,5-triazine, and 2,2',4,4'-tetrahydroxybenzophenone are preferable.

(Light Stabilizer)

Examples of a light stabilizer include a hindered amine light stabilizer, and molecular weight thereof is preferably 1000 or below. In this case, weather resistance of the molded product can be further improved. From the same viewpoint, the molecular weight of the light stabilizer is more preferably 900 or larger. In addition, the molecular weight of the light stabilizer is preferably 300 or smaller. In this case, the heat resistance can be further improved, and the contamination of a mold can be prevented more certainly at the time of molding. As a result, it is possible to obtain a molded product more excellent in surface appearance. From the same viewpoint, the molecular weight of the light stabilizer is more preferably 400 or larger. Further, the light stabilizer is preferably a compound having a piperidine structure. The piperidine structure defined here may be any amine structure as long as it has a saturated six-membered ring, and those in which a part of the piperidine structure is substituted by a substituent are also included. Examples of a substituent include an alkyl group having a carbon number of four or below, and particularly a methyl group is preferable. Particularly, a compound having a plurality of piperidine structures is preferable, and a compound in which the plurality of piperidine structures are linked by an ester structure.

Examples of such light stabilizers include 4-piperidinol, 2,2,6,6-tetramethyl-4-benzoate, bis(2,2,6,6-tetramethyl-piperidyl) sebacate, bis(1,2,2,6,6-pentamethyl-4-piperidyl) sebacate, tetrakis(2,2,6,6-tetramethylpiperidine-4-carboxylic acid) 1,2,3,4-butanetetrayl, a condensate of 2,2,6,6-tetramethyl-pyrrolidinol, tridecyl alcohol and 1,2,3,4-butanetetracarboxylic acid, a condensate of 1,2,2,6,6-pentamethyl-4-piperidyl, and tridecyl alcohol and tridecyl-1,2,3,4-butanetetracarboxylate, bis(1,2,3,6,6-pentamethyl-4-piperidyl) {[3,5-bis(1,1-dimethyl)-4-hydroxyphenyl] methyl} butyl malonate, decanedioic acid bis[2,2,6,6-tetramethyl-1-(octyloxy)-4-piperidinyl] ester, a reaction product of 1,1-dimethylethyl hydro peroxide and octane, 1-{2-[3-(3,5-di-tert-butyl-4-hydroxyphenyl) propionyloxy] ethyl}-4-[3-(3,5-di-tert-butyl-4-hydroxyphenyl) propionyloxy]-2,2,6,6-tetramethylpiperidine, a condendate of tetrakis (1,2,2,6,6-pentamethyl-4-piperidyl) 1,2,3,4-butanetetracarboxylate, poly[{6-(1,1,3,3-tetramethylbutyl) amino-1,3,5-triazine-2,4-diyl} {(2,2,6,6-tetramethyl-4-piperidyl) imino} hexamethylene {(2,2,6,6-tetramethyl-4-piperidyl) imino}], N,N'-bis(2,2,6,6-tetramethyl-4-piperidyl)-1,6-hexanediamine polymer and 2,4,6-trichloro-1,3,5-triazine, a condensate of 1,2,3,4-butanetetracarboxylic acid, 2,2,6,6-tetramethyl-4-piperidinol and β,β,β,β-tetramethyl-3,9-(2,4,8,10-tetraoxaspiro [5,5] undecane-diethanol, an N,N'-bis(3-aminopropyl) ethylenediamine-2,4-bis[N-butyl-N-(1,2,2,6, 6-pentamethyl-4-piperidyl) amino]-6-chloro-1,3,5-triazine condensate, a dimethyl succinate-1-(2-hydroxyethyl)-4-hydroxy-2,2,6,6-tetramethylpiperidine polycondensate, and the like.

A content of the light stabilizer is preferably 0.001 part by weight or more and 5 parts by weight or less per 100 parts by weight of the total amount of the polycarbonate resin (A) and the polyrotaxane (B). In this case, coloration of the polycarbonate resin composition can be further prevented. As a result, for example, in a case where a colorant is added, it is possible to obtain jet black having depth and clarity. In addition, in this case, light resistance of the polycarbonate resin composition can be further improved, and even the polycarbonate resin composition is applied to application for example, automobile interior and exterior trim, excellent light resistance can be exerted. The content of the light stabilizer is preferably 0.005 part by weight or more and 3 parts by weight or less, and further preferably 0.01 part by weight or more and 1 part by weight or less per 100 parts by weight of the total amount of the polycarbonate resin (A) and the polyrotaxane (B). In this connection, the polyrotaxane (B) tends to be easy to decompose by the hindered amine light stabilizer. Therefore, in a ratio of the polycarbonate resin (A) and the polyrotaxane (B), in a case where the polyrotaxane (B) is much, it is preferable to set the addition amount of the light stabilizer modestly.

(Release Agent)

As a release agent for giving release characteristics in molding, the polycarbonate resin composition may contain 0.0001 part by weight or more and 2 parts by weight or less of fatty ester of polyhydric alcohol per 100 parts by weight of the polycarbonate resin. By adjusting an amount of the fatty ester of polyhydric alcohol in this range, an addition effect is obtained sufficiently, and at the time of release in molding process, it can be prevented more certainly that the molded product breaks up by release failure. Further, in this case, cloudiness of the resin composition and increase of an attachment attached on the mold at the time of molding process can be further inhibited. A content of the fatty ester of polyhydric alcohol is more preferably 0.01 part by weight or more and 1.5 parts by weight or less, and further preferably 0.1 part by weight or more and 1 part by weight or less.

As the fatty ester of polyhydric alcohol, partial esters or total esters of the polyhydric alcohol having a carbon number of 1 to 20 and a saturated fatty acid having a carbon number of 10 to 30 are preferable. Examples of partial esters or total esters of such a polyhydric alcohol and saturated fatty acid include stearic acid monoglyceride, stearic acid diglyceride, stearic acid triglyceride, stearic acid monosorbitate, behenic acid monoglyceride, pentaerythritol monostearate, pentaerythritol distearate, pentaerythritol tetrastearate, pentaerythritol tetrapelargonate, propylene glycol monostearate, isopropyl palmitate, sorbitan monostearate, and the like. Especially, stearic acid monoglyceride, stearic acid triglyceride, and pentaerythritol tetrastearate are preferably used.

In addition, from the viewpoint of heat resistance and moisture resistance, as the fatty ester of polyhydric alcohol, total esters are more preferable.

As the fatty acid, a higher fatty acid is preferable, and a saturated fatty acid having a carbon number of 10~30 is more preferable. Examples of such a fatty acid include myristic acid, lauric acid, palmitic acid, stearic acid, behenic acid, and the like.

In addition, in the fatty ester of polyhydric alcohol, it is preferable that the polyhydric alcohol is ethylene glycol. In this case, when the ethylene glycol is added to the resin, the release characteristics can be improved without damaging transparency of the resin.

In addition, it is preferable that the fatty ester of polyhydric alcohol is fatty diester of dihydric alcohol. In this case, when the fatty diester of dihydric alcohol is added to the resin, decrease of molecular weight of the resin composition in a moist heat environment can be inhibited.

In the present embodiment, in an addition period of the release agent combined in the polycarbonate resin composition, an addition method is not particularly limited. Examples of the addition period include a case where the polycarbonate resin is produced by an ester exchange method, at the end of a polymerization reaction; a state where the polycarbonate resin composition melts during kneading and the like of the polycarbonate resin composition and other combination agents regardless of the polymerization method; and an occasion of blending and kneading with the polycarbonate resin composition having a solid state such as pellet or powder, or the like. The addition method can be a method of directly mixing or kneading a release agent in the polycarbonate resin composition; and a method of adding a high-concentration master batch made by using a small amount of the polycarbonate resin composition or a release agent with other resins and the like.

(Other Resins)

In addition, in a range where the effect of the present invention is not impaired, the polycarbonate resin composition can be kneaded with for example, one or more of a synthetic resin such as an aromatic polyester, an aliphatic polyester, a polyamide, a polystyrene, a polyolefin, an acrylic, an amorphous polyolefin, ABS, AS (acrylonitrile styrene) and the like, a biodegradable resin such as polylactic acid, polybutylene succinate and the like, and the like, and can also be used as a polymer alloy. As a compounding amount of the polycarbonate resin composition of the present invention, a proportion thereof is preferably 1 part by weight or more and 30 parts by weight or less, more preferably 3 parts by weight or more and 20 parts by weight or less, and further preferably 5 parts by weight or more and 10 parts by weight or less per 100 parts by weight of the mixture of the polycarbonate resin (A) and the polyrotaxane (B) used in the present invention.

(Inorganic Filler, Organic Filler)

For the polycarbonate resin composition, in a range where design can be maintained, a well-known inorganic filler and organic filler may be contained, and in detail, an inorganic filler such as glass fiber, glass milled fiber, glass flakes, glass beads, silica, alumina, titanium oxide, calcium sulfate powder, gypsum, gypsum whiskers, barium sulfate, talc, calcium silicate such as mica, wollastonite and the like, carbon black, graphite, iron powder, copper powder, molybdenum disulfide, silicon carbide, silicon carbide fiber, silicon nitride, silicon nitride fiber, brass fiber, stainless steel fiber, potassium titanate fiber, whiskers of these and the like; a powdered organic filler such as wood flour, bamboo powder, palm starch, cork powder, and pulp powder; a ballooning and spherical organic filler such as cross-linked polyester, polystyrene, styrene and acrylic copolymer, and urea resin;

a fibrous organic filler such as carbon fiber, synthetic fiber, and natural fiber can also be added.

[Production Method of Polycarbonate Resin Composition]

The polycarbonate resin composition of the present invention can be produced by performing a reaction process where the polycarbonate resin (A) and the polyrotaxane (B) are melt-reacted. Preferably, an addition process where 0.5 ppm by weight or more and 1000 ppm by weight or less of the specific compound (C) converted in a metal amount is added to the polycarbonate resin (A) and the polyrotaxane (B) is performed, and then the reaction process where the polycarbonate resin (A) and the polyrotaxane (B) are melt-reacted is performed, and the polycarbonate resin composition is produced. In the reaction process, the ester exchange reaction between the polycarbonate resin (A) and the polyrotaxane (B) is promoted, and the resin composition having high compatibility is obtained due to presence of the compound (C). In this connection, the polycarbonate resin (A), the polyrotaxane (B), and the compound (C) same as the above can be used.

In the polycarbonate resin composition, the above components can be mixed and produced in a predetermined proportion or in any order by a blending machine such as a tumbler, a V-shaped blender, a Nauta mixer, a Bunbury mixer, a kneading roll, and an extruder. Among them, the components which can be mixed in a depressurized state at the time of melting and mixing is more preferable.

For the melting kneading machine, the type of a twin screw extruder or a single screw extruder is not limited as long as mixing can be achieved in a depressurized state, and in order to achieve reaction and mixing according to characteristics of the used polycarbonate resin (A) and the polyrotaxane (B), the twin screw extruder is more preferable.

The mixing temperature of the polycarbonate resin composition is preferably from 190° C. to 280° C. In this case, reduction of time required by the reaction and kneading is possible, and an amount of the compound (C) required by the reaction can be inhibited. As a result, it can be prevented more certainly that the color tone deteriorates with deterioration of the resin, and physical characteristics in practical aspects such as impact resistance and moist heat resistance can be further improved. In addition, from the viewpoint of avoiding the same resin deterioration more certainly, useless extension should be avoided, and although there is balance with the amount of the compound (C) or the mixing temperature, the mixing time is preferably 10 seconds or longer and 150 seconds or shorter, and more preferably 10 seconds or longer and 25 seconds or shorter. Condition setting of the amount of the compound (C) or the mixing temperature to satisfy this is necessary.

Although there is no particular limit, it is preferable that the melt reaction in the reaction process is performed in a condition of a vacuum degree of 30 kPa or lower. The vacuum degree may be more preferably 25 kPa or lower, and further preferably 15 kPa or lower. The vacuum degree described here represents absolute pressure, and was calculated via reading vacuum pressure gauge and a conversion formula (101 kPa−(vacuum pressure counted value)).

By performing the reaction process under depressurization and controlling a depressurization condition thereof in the specific range, in the reaction process, it is easy to remove a byproduct produced at the time of the ester exchange reaction between the polycarbonate resin (A) and the polyrotaxane (B). As a result, the ester exchange reaction is easy to proceed, and a resin composition having higher compatibility between the polycarbonate resin (A) and the polyrotaxane (B) can be produced.

[Molded Body]

The polycarbonate resin composition of the present invention can be formed by a generally known method such as a projection molding method, a extrusion molding method, a compression molding method, and a hot press molding method. The molded body obtained by molding the polycarbonate resin composition of the present invention is excellent in transparency, and also in biological origin material content rate, heat resistance, moist heat resistance, and impact resistance at high levels in good balance. In addition, in the molded body molding the polycarbonate resin composition, it is possible to improve color tone, weather resistance, mechanical strength and the like, and to reduce residual components having low molecular weight and foreign substances. Therefore, the molded body is suitable for interior components for vehicles.

Since the polycarbonate resin composition is excellent in hue, transparency, heat resistance, mechanical strength and the like, the field of projection molding such as an electrical/electronic component, an automobile component, and glass substituted use; the field of extrusion molding such as the field of film and sheet, and the field of bottle and container; lens use such as a camera lens, a finder lens, and a lens for CCD and CMOS; an optical film and an optical sheet such as a phase difference film, a diffusion sheet, a light guide plate, and a polarizing film that are applied to a liquid crystal and organic EL (Electro Luminescence) display and the like; a light disk, an optical material, an optical component; coloring matter and a charge transfer agent; and the like can be applied to a wide range of field of immobilized binder use.

Since the polycarbonate resin composition is excellent in transparency, heat resistance, mechanical strength, and the like, and excellent in sharpness even colorated with colorant and the like, it can be applied to use such as an automobile interior and exterior component, an electrical/electronic component, and a housing. Examples of the automobile interior and exterior component include a fender, a bumper, a fascia, a door panel, a side garnish, a pillar, a radiator grill, a side protector, a side molding, a rear protector, a rear molding, various spoilers, a bonnet, a roof panel, a trunk lid, a detachable top, a window reflector, a mirror washing, outer door handle, and the like. Examples of the automobile interior component include an instrument panel, a center console panel, a meter component, various switches, a car navigation component, a car audio visual component, an automobile computer component, and the like. Examples of the electric/electronic component and the housing include exterior components of personal computers such as a desktop personal computer and a notebook computer, exterior components of OA (Office Automation) equipment such as a printer, a copy machine, a scanner, and a fax (including a combined machine of these), exterior components of display devices (such as CRT, liquid crystal, plasma, projector, and organic EL devices), exterior components such as a mouse, switch mechanism components such as keyboard keys and various switches, and exterior components of game machines (such as a home game machine, a professional game machine, a pachinko, and a slot machine). Further, drives of a portable information terminal (so-called PDA), a mobile phone, a portable book (dictionaries and the like), and recording media (CD, MD, DVD, next generation high density disk, hard disk, and the like), reading devices of recording media (IC card, smart media, memory stick, and the like), electrical OA equipment such as an optical camera, a digital camera, a parabolic antenna, a power tool, a VTR, an iron, a hair dryer, a rice cooker, a microwave oven, a hot plate, an acoustic equipment, a lighting equipment, a refrigerator, an air conditioner, an air cleaner, a negative ion generator, and a clock, and household appliances can be included.

EXAMPLES

Hereinafter, the present invention will be described in more detail by Examples, and unless the summary thereof is exceeded, the present invention is not limited by the following Examples.

[Evaluation Method]

In the following, physical properties or characteristics of the polycarbonate resin (A), the polyrotaxane (B), and the resin composition was evaluated by the following method.

(1) Tensile Elongation Measurement

A breaking point elongation rate was measured at a room temperature of 23° C. at a pulling speed of 50 mm/min by using Strograph form name VG10E manufactured by Toyo Seiki Co., Ltd. In this connection, the larger a numerical value of tensile elongation is, the more excellent the mechanical strength is, and mechanical strength of 12% or more was judged as excellent mechanical strength in the present invention.

(2) Total Light Transmittance

Pellets of the polycarbonate resin composition were dried at 90° C. for 4 hours or longer by using a hot-air dryer. Then, a projection molding plate (width 100 mm×length 100 mm×thickness 2 mm) was obtained by supplying the dried pellets to an projection molding machine (J75EII type manufactured by Japan Steel Works, Ltd.) and performing molding in a condition of a molding circle of 50 seconds. Total light transmittance of the projection molding plate was measured in a D65 light source by using a haze meter "NDH2000" manufactured by Nippon Denshoku Industries, Co., LTD. In this connection, the larger the total light transmittance is, the more excellent in transparency is, and in the present invention, a total light transmittance of 55% or higher was judged as excellent in transparency. Further, a total light transmittance of 65% or higher was taken as particularly excellent in transparency.

(3) Notched Charpy Impact Strength

A notched charpy impact strength test was conducted on the following obtained ISO test piece for a mechanical characteristic test according to ISO179 (2000), and the notched charpy impact strength was obtained. In this test, a notch tip radius was measured by using a test piece of 0.50R. In this connection, the larger a numerical value of the notched charpy impact strength is, the more excellent the impact resistance strength is, and mechanical strength of 20 kJ/m$^2$ or more was judged as excellent mechanical strength in the present invention.

(4) Melt Viscosity

Melt viscosity was measured in a condition of an orifice length of 10 mm and an orifice diameter of 1 mm at a shearing speed of 91.2 sec$^{-1}$ and a temperature of 250° C. by using a Capiro graph, a form name of CAPIRO GRAPH 1B manufactured by Toyo Seiki Co., Ltd.

(5) Glass Transition Temperature

Glass transition temperature was measured by using a differential scanning calorimeter (DSC6220 manufactured by SII NanoTechnology Inc.).

About 10 mg of a polycarbonate resin sample was placed and sealed in an aluminum pan manufactured by the same company, and temperature was raised from room temperature to 250° C. at a temperature rising speed of 20° C./min under 50 mL/min of nitrogen airflow. After being maintained for three minutes, the temperature was cooled at a speed of 20° C./min to 30° C. The temperature was maintained at 30° C. for three minutes, and raised at a speed of 20° C./min again to 200° C. According to DSC data obtained at the second temperature rise, a extrapolated glass transition starting temperature was determined as a temperature at an intersection point of a straight line extending a baseline of a low temperature side to a high temperature side and a tangent line drawn at a point where a gradient of a curve of a stepwise changing part of glass transition is maximum, and was taken as the glass transition temperature.

(6) Reduced Viscosity

A sample of the polycarbonate resin was dissolved by using methylene chloride as a solvent, and a polycarbonate solution having a concentration of 0.6 g/dL was prepared. Being measured at 20.0° C.±0.1° C. using an Ubbelohde type viscometer manufactured by Moritomo Rika Kogyo Co., Ltd., relative viscosity $\eta_{rel}$ was determined according to the following equation from passing time to of solvent and passing time t of solution.

$$\eta_{rel}=t/t_0$$

Specific viscosity was determined according to the following equation from the relative viscosity.

$$\eta_{sp}=(\eta-\eta_0)/\eta_0=\eta_{rel}-1$$

The specific viscosity was divided by concentration c (g/dL) to determine reduced viscosity $\eta_{sp}$/c. The larger this value is, the larger the molecular weight is.

(7) Moist Heat Resistance Test

Pellets of the polycarbonate resin composition was dried at 90° C. for 4 hours or longer by using a hot-air dryer (a box dryer PO-80 manufactured by MATSUI MFG. CO., LTD.). In the following, dried pellets were supplied to an projection molding machine (JJ75EII type manufactured by The Japan Steel Works, LTD.), and an projection molding plate (width 100 mm×length 100 mm×thickness 2 mm) was obtained by molding in conditions of a resin temperature of 240° C., a mold temperature of 60° C., and a molding circle of 50 seconds. After being cut into width 50 mm*length 50 mm, the molding plate was processed by standing in ETAC HIFLEX FX224P manufactured by Kusumoto Chemicals, Ltd. for 264 hours in conditions of a temperature of 85° C. and a relative humidity of 85%.

For change of YI (ΔYI) before and after the moist heat resistance test, YI of the projection molding plate was measured under a C light source using a color measuring color-difference meter "ZE-2000" manufactured by Nippon Denshoku Industries, Co. LTD. according to JIS K7136 (2000), and a difference (ΔYI) of values of YI before and after the moist heat resistance test was calculated. In addition, the total light transmittance after the moist heat resistance test was also measured, and a difference of the total light transmittance before and after the test was calculated.

In this evaluation, the smaller the value of ΔYI is, the smaller the change of color tone at the time of long-term use under an environment of high temperature and high moisture is, and excellent moist heat resistance is shown. In this connection, in this Example, 6.0 or less of the value of ΔYI in this evaluation was excellent in moist heat resistance. Further, 5.0 or less of the value of ΔYI was particularly excellent in moist heat resistance.

As the same, the smaller a change of the total light transmittance before and after the moist heat resistance test is, the smaller a change of transparency at the time of long-term use under an environment of high temperature and high moisture is, and excellent moist heat resistance is shown. In this connection, in this Example, −3.0 or below of the change of the total light transmittance before and after the moist heat resistance test in this evaluation was excellent in moist heat resistance. Further, −1.0 or below of the change of the total light transmittance before and after the moist heat resistance test was excellent particularly in moist heat resistance.

Particularly, −2.0 or below of the change of the total light transmittance before and after the moist heat resistance test and −5.0 or below of the value of ΔYI before and after the moist heat resistance test were extremely excellent in moist heat resistance.

[Used Raw Materials]

Abbreviations and manufacturers of compounds used in the following Examples and Comparative Examples are as follows.

[Polycarbonate Resin (A)]

<Dihydroxy Compound>

ISB: Isosorbide [manufactured by Rocket Foil Co., Ltd.]
CHDM: 1,4-cyclohexanedimethanol (manufactured by SK Chemicals)

<Carbonic Acid Ester>

DPC: Diphenyl carbonate [manufactured by Mitsubishi Chemical Corporation]

<Catalyst Deactivating Agent (Acidic Compound)>

Phosphorous acid [manufactured by Taihei Chemical Industry Co., Ltd.] (molecular weight 82.0)

<Heat Stabilizer (Antioxidant)>

Irganox 1010: pentaerythritol-tetrakis[3-(3,5-di-tert-butyl-4-hydroxyphenyl) propionate] [manufactured by BASF Co.]
AS 2112: tris(2,4-di-tert-butylphenyl) phosphite [manufactured by ADEKA Corporation] (molecular weight: 646.9)

<Release Agent>

E-275: Ethylene glycol distearate (manufactured by NOF CORPORATION)

[Polyrotaxane (B)]

Hydroxy-containing polyrotaxane (cyclic molecule: cyclodextrin having a hydroxy end (polycaprolactone chain), axial molecule: polyethylene glycol [manufactured by Advanced Softmaterials Inc. Product name: Selum Super Polymer SH2400P (total molecular weight: 400,000, molecular weight of the axial molecule: 20,000), SH3400P (total molecular weight: 700,000, molecular weight of the axial molecule: 35,000), CAS No.: 928045-45-8]

[Compound (C)]

Magnesium acetate tetrahydrate [manufactured by Wako Pure Chemical Industries, Ltd.] (one adjusted to a 2% by weight aqueous solution was used in Examples.)
Lithium stearate [manufactured by Tokyo Chemical Industry Co., Ltd.] (one adjusted to a 10% by weight aqueous solution was used in Examples.)

[Impact Modifier (D)]

Core shell rubber M-590 (manufactured by Kaneka Corporation)

[Production Example 1 of Polycarbonate Resin (A)]

Polymerization of the polycarbonate resin was performed using continuous polymerization equipment consisting of three vertical stirring reactors, one horizontal stirring reactor, and a twin screw extruder. Specifically, ISB, CHDM, and DPC were melted separately in a tank and supplied continuously to a first vertical stirring reactor in a flow rate of ISB of 35.2 kg/hr, CHDM of 14.9 kg/hr, and DPC of 74.5 kg/hr (ISB/CHDM/DPC in a molar ratio=0.700/0.300/1.010). At the same time, an aqueous solution of calcium acetate monohydrate was supplied to the first vertical stirring reactor so that an added amount of calcium acetate monohydrate as a catalyst was 1.5 μmol with respect to 1 mol of all dihydroxy compounds. The reaction temperature, internal pressure and residence time in each reactor were 190° C., 25 kPa, 90 minutes in the first vertical stirring reactor, 195° C., 10 kPa, 45 minutes in a second vertical stirring reactor, 210° C., 3 kPa, 45 minutes in a third vertical stirring reactor, and 225° C., 0.5 kPa, 90 minutes in a fourth horizontal stirring reactor respectively. Operation was performed with finely adjusting the internal pressure of the fourth horizontal stirring reactor so that the reduced viscosity of the obtained polycarbonate resin was 0.41 dL/g to 0.43 dL/g.

The polycarbonate resin was extracted from the fourth horizontal stirring reactor in an amount of 60 kg/hr and was supplied to a vented twin-screw extruder [(TEX30α manufactured by Japan Steel Works, Ltd., L/D: 42.0, L (mm): length of the screw, D (mm): diameter of the screw] with the resin in a melted state. The polycarbonate resin passing the extruder passed a candle type filter (manufactured by SUS316) having meshes of 10 μm continuously in the melted state to filter foreign matter. Thereafter, the polycarbonate resin was discharged in a strand shape from dies, and was pelletized with a rotary cutter after being cooled with water and solidified, and a copolymerized polycarbonate resin having a molar ratio of ISB/CHDM of 70/30 mol % was obtained.

The extruder has three vacuum vent ports, at which residual components having low molecular weight in the resin were removed by devolatilization. At the second vent, 2000 ppm by weight of water was added to the resin, and devolatilization by injecting water was performed. At the third vent, 0.1 part by weight, 0.05 part by weight, and 0.3 part by weight of Irganox 1010, AS2112, and E-275 respectively were added to 100 parts by weight of the polycarbonate resin. Thus, ISB/CHDM copolymer polycarbonate resin pellets were obtained. As a catalyst deactivating agent, 0.65 ppm by weight of phosphorous acid (0.24 ppm by weight as an amount of phosphorus atom) was added to the polycarbonate resin. In this connection, phosphorous acid was added in the following manner. A mixed master batch was prepared by painting an ethanol solution of phosphorous acid on pellets of the polycarbonate resin obtained in Production Example 1, and 1 part by weight of the master batch per 100 parts by weight of the polycarbonate resin in the extruder was supplied from this side of the first vent port of the extruder (a resin supply port of the extruder).

The polycarbonate resin (A) obtained in Production Example 1 is referred to as "PC-A1". Physical properties of PC-A1 were as follows.

Glass transition temperature: 120° C.
Reduced viscosity: 0.42 dL/g
Melt viscosity (240° C., shearing speed 91.2 sec$^{-1}$): 720 Pa·s Example 1

47.5 g of the copolymerized polycarbonate resin obtained and 2.5 g of Selum Super Polymer SH2400P as polyrotaxane in Production Example 1 were kneaded at 240° C. for 10 minutes using Laboplast Mill 4C 150-01 manufactured by Tokyo Seiki Co., Ltd. (a compounding ratio is seen in Table 1).

The obtained kneaded resin was dried for 5 hours in a reduced pressure dryer at 90° C., and then hot pressing was performed at 200° C. for 10 minutes using a hot press (mini test press (200×200 mm) type MP-2FH) manufactured by Toyo Seiki Co., Ltd., and a composite composition press plate of copolymerized polycarbonate and polyrotaxane having a thickness of 0.5 mm was obtained. A test piece for total light transmittance evaluation and a tensile test were punched on the obtained press plate, and an elongation amount was evaluated by the tensile test.

Example 2

As shown in Table 1, production and evaluation of a test piece of a resin composition containing polycarbonate resin (A) and polyrotaxane (B) were performed in the same way as Example 2 except for further adding compound (C).

Example 3

As shown in Table 1, production and evaluation of a test piece were performed in the same way as Example 2 except for altering the type of polyrotaxane (B) in Example 2.

Comparative Example 1

Production and evaluation of a test piece were performed in the same way as Example 1 except for without addition of polyrotaxane (B) in Example 1.

(EC-75 manufactured by TOSHIBA MACHINE CO., LTD). Molding conditions include a mold temperature of 60° C. and a cylinder temperature of 240° C. In this way, a test piece made of a plate-shaped molded body of width 100 mm×length 100 mm×thickness 2 mm and an ISO tensile test piece were obtained. For the obtained ISO tensile test piece, a charpy impact test piece with a 0.5 mm notch was cut out, and a charpy impact test was conducted. In addition, for a plate-shaped molded product, measurement of total light transmittance was performed on a sample cut into width 50 mm×length 50 mm.

Example 5

As shown in Table 2, production and evaluation of a test piece of a resin composition containing polycarbonate resin (A) and polyrotaxane (B) were performed in the same way as Example 2 in addition to altering the type of polyrotaxane (B).

Example 6

2850 parts by weight of polycarbonate resin pellets PC-A1, 150 g of Selem Super Polymer SH3400P as polyrotaxane, and a 10% by weight aqueous solution of 15 g of lithium stearate obtained in Production Example 1 were

TABLE 1

| | | | Unit | Example 1 | Example 2 | Example 3 | Comparative Example 1 |
|---|---|---|---|---|---|---|---|
| Polycathonate resin composition | Polycarbonate resin (A) | PC-A1 | Parts by weight | 95 | 95 | 95 | 100 |
| | Polyrotaxane (B) | SH3400P | Parts by weight | 5 | 5 | | |
| | | SH2400P | Parts by weight | | | 5 | |
| | Compound (C) | Magnesium acetate (as a magnesium amount) | ppm | | 6 | 6 | |
| Evaluation | Tensile elongation | | % | 15.6 | 13.4 | 16.8 | 10.8 |
| | Total light transmittance | | % | 59 | 83 | 84 | 91 |

(Compounding proportions of compound (C) in Table 1 are values when a total amount of polycarbonate resin (A) and polyrotaxane (B) was 100, and blank columns show that the material is not used.)

Example 4

After blending 4750 g of copolymerized polycarbonate resin pellets, 250 g of Selem Super Polymer SH3400P as polyrotaxane, and a 2% by weight aqueous solution of 18 g of magnesium acetate obtained in Production Example 1 (a compounding ratio is seen in Table 2), extrusion was performed at 240° C. with devolatilizing to remove residual components having low molecular weight in the resin using a 30 mm twin screw extruder (TEX-30a manufactured by Japan Steel Works, Ltd. L/D=52.5) equipped with a vacuum vent, and composite composition pellets of copolymerized polycarbonate and polyrotaxane were obtained. Next, after drying the obtained pellets for five hours with a hot-air dryer having a temperature of 90° C., projection molding of pellets was performed using a 75-ton projection molding machine blended (a compounding ratio is seen in Table 2), extrusion was performed at 230° C. with devolatilizing to remove residual components having low molecular weight in the resin with using a 15 mm twin screw extruder (KZW15-30MG manufactured by Technovel Corporation) equipped with a vacuum vent, and polycarbonate resin composition pellets were obtained. Next, after drying the obtained pellets for five hours with a hot-air dryer having a temperature of 90° C., projection molding of pellets was performed with using a 75-ton projection molding machine (EC-75 manufactured by TOSHIBA MACHINE CO., LTD). Molding conditions include a mold temperature of 60° C. and a cylinder temperature of 240° C. In this way, a test piece made of a plate-shaped molded body of width 100 mm×length 100 mm×thickness 2 mm and an ISO tensile test piece were obtained. For the obtained ISO tensile test piece, a charpy impact test piece with a 0.5 mm notch was cut out, and a charpy impact test was conducted. In addition, for a plate-shaped molded product, measurement of total light transmittance was performed on a sample cut into width 50 mm×length 50 mm.

Comparative Example 2

The polycarbonate resin (A) obtained in Production Example 1 was projection molded as it was without experiencing the process described in Example 4 to perform production and evaluation of a test piece.

Comparative Example 3

Production and evaluation of a test piece of a resin composition containing polycarbonate resin (A) and the impact modifier (D) were performed in the same way as Example 6, except that 2850 parts by weight of polycarbonate resin pellets PC-A1 obtained in Production Example 1 and M590 as an impact modifier were blended (a compounding ratio is seen in Table 2); extrusion was performed at 230° C. with devolatilizing to remove residual components having low molecular weight in the resin with using a 15 mm twin screw extruder (KZW15-30MG manufactured by Technovel Corporation) equipped with a vacuum vent; and polycarbonate resin composition pellets were obtained.

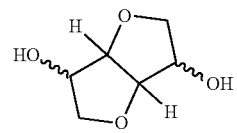

(1)

and
a polyrotaxane (B).

2. The polycarbonate resin composition according to claim 1, wherein in the constitution unit of the polycarbonate resin (A), a proportion of the constitution unit derived from the compound represented by the formula (1) exceeds 30 mol % per 100 mol % of constitution units derived from all dihydroxy compounds.

3. The polycarbonate resin composition according to claim 1, comprising 0.1 part by weight or more and less than 20 parts by weight of the polyrotaxane (B) per 100 parts by weight of a total amount of the polycarbonate resin (A) and the polyrotaxane (B).

TABLE 2

| | | | Unit | Example 4 | Example 5 | Example 6 | Comparative Example 2 | Comparative Example 3 |
|---|---|---|---|---|---|---|---|---|
| Polycathonate resin composition | Polycarbonate resin (A) | PC-A1 | Parts by weight | 95 | 95 | 95 | 100 | 95 |
| | Polycarbonate (B) | SH3400P | Parts by weight | 5 | | | | |
| | | SH2400P | Parts by weight | | 5 | 5 | | |
| | Compound (C) | Magnesium acetate (as a magnesium amount) | ppm | 12 | 12 | | | |
| | | Lithium stearate (as a lithium amount) | ppm | | | 12 | | |
| | Impact modifier | M-590 | Parts by weight | | | | | 5 |
| Evaluation | notched Charpy impact strength | | kJ/m$^2$ | 44 | 41 | 20 | 17 | 51 |
| | Total light transmittance | | % | 71 | 71 | 86 | 91 | 89 |
| | Total light transmittance after moist heat resistance test | | % | 69 | 70 | 85 | 91 | 85 |
| | Change of total light transmittance before and after moist heat resistance | | % | −2 | −1 | −1 | 0 | −4 |
| | ΔYI before and after moist heat resistance test | | — | 4.4 | 4.2 | 5.2 | 0.6 | 14.6 |

(Compounding proportions of compound (C) in Table 2 are values when a total amount of polycarbonate resin (A) and polyrotaxane (B) was 100, and blank columns show the material is not used.)

From Table 1 and Table 2, it is obvious that the resin composition of the present application is excellent in mechanical characteristics such as tensile elongation and impact resistance. In addition, balance of mechanical characteristics, transparency and moist heat resistance is excellent by further adding compound (C) to the resin composition.

Although the present invention has been described in detail and with reference to particular embodiments, it will be apparent to those skilled in the art that various changes and modifications can be made without departing from the spirit and scope of the present invention. This application is based on Japanese Patent Application (Patent Application 2015-191606) filed on Sep. 29, 2015, the contents of which are incorporated herein as reference.

The invention claimed is:

1. A polycarbonate resin composition comprising:
   a polycarbonate resin (A) having a constitution unit derived from a compound represented by at least the following formula (1)

4. The polycarbonate resin composition according to claim 1, wherein the polyrotaxane (B) comprises polyethylene glycol and a cyclodextrin molecule.

5. The polycarbonate resin composition according to claim 1, further comprising at least a pound (C) selected from a compound of Group 1 metal in a long-period periodic table and a compound of Group 2 metal in a long-period periodic table.

6. The polycarbonate resin composition according to claim 5, wherein a content of the compound (C) is 0.5 ppm by weight or more and 1000 ppm by weight or less in a metal amount in the compound (C) per 100 parts by weight of a total amount of the polycarbonate resin (A) and the polyrotaxane (B) in the polycarbonate resin composition.

7. The polycarbonate resin composition according to claim 5, wherein the compound (C) is at least one selected from the group consisting of an inorganic salt (including carbonate), a carboxylate, a phenolate, a halogen compound, and a hydroxide.

8. The polycarbonate resin composition according to claim 5, wherein the compound (C) is at least one selected from the group consisting of a sodium compound, a potassium compound, a magnesium compound, a calcium compound, and a cesium compound.

9. A molded body obtained by molding the polycarbonate resin composition according to claim 1.

10. The polycarbonate resin composition according to claim 1, wherein in the constitution unit of the polycarbonate resin (A), a proportion of the constitution unit derived from the compound represented by the formula (1) is 65-85 mol % per 100 mol % of constitution units derived from all dihydroxy compounds.

11. The polycarbonate resin composition according to claim 10, wherein the compound represented by formula (1) is isosorbide and wherein the polyrotaxane (B) comprises polyethylene glycol and a cyclodextrin molecule.

12. The polycarbonate resin composition according to claim 11, further comprising at least one compound (C) selected from a compound of Group 1 metal in a long-period periodic table and a compound of Group 2 metal in a long-period periodic table.

13. The polycarbonate resin composition according to claim 1, wherein a glass transition temperature of the polycarbonate resin composition is 110° C. or higher and 190° C. or lower.

14. The polycarbonate resin composition according to claim 1, wherein an amount of the polyrotaxane (B) in the polycarbonate resin composition is 0.1 parts by weight or larger and smaller than 20 parts by weight per 100 parts by weight of the total amount of the polycarbonate resin (A) and the polyrotaxane (B).

15. The polycarbonate resin composition according to claim 11, wherein an amount of the polyrotaxane (B) in the polycarbonate resin composition is 0.1 parts by weight or larger and smaller than 20 parts by weight per 100 parts by weight of the total amount of the polycarbonate resin (A) and the polyrotaxane (B).

16. The polycarbonate resin composition according to claim 12, wherein an amount of the polyrotaxane (B) in the polycarbonate resin composition is 0.1 parts by weight or larger and smaller than 20 parts by weight per 100 parts by weight of the total amount of the polycarbonate resin (A) and the polyrotaxane (B).

* * * * *